(12) United States Patent
Okamoto

(10) Patent No.: US 7,723,418 B2
(45) Date of Patent: May 25, 2010

(54) ANTISTATIC RESIN COMPOSITION

(75) Inventor: Tokiko Okamoto, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/930,399

(22) Filed: Aug. 30, 2004

(65) Prior Publication Data

US 2005/0049360 A1    Mar. 3, 2005

(30) Foreign Application Priority Data

Aug. 29, 2003    (JP) ............................. 2003-308063

(51) Int. Cl.
*C08L 23/02*    (2006.01)
*C08L 53/00*    (2006.01)
*C08K 5/00*    (2006.01)

(52) U.S. Cl. .................................... 524/394; 525/92 A

(58) Field of Classification Search ............... 525/92 A; 524/394
See application file for complete search history.

(56) References Cited

U.S. PATENT DOCUMENTS

| | | | | |
|---|---|---|---|---|
| 5,096,995 A * | 3/1992 | Fukumoto et al. | ........... | 528/125 |
| 5,395,870 A * | 3/1995 | Suzuki et al. | ............... | 524/136 |
| 5,434,219 A * | 7/1995 | Oomura et al. | ............... | 525/84 |
| 5,652,326 A * | 7/1997 | Ueda et al. | .................. | 528/288 |
| 5,981,031 A * | 11/1999 | Vogt et al. | ................... | 428/147 |
| 6,498,215 B2 * | 12/2002 | Suzuki et al. | ................ | 525/191 |
| 2004/0110899 A1 * | 6/2004 | Miara et al. | .................... | 525/63 |
| 2005/0171251 A1 * | 8/2005 | Nakajima et al. | ............. | 524/59 |
| 2005/0260912 A1 * | 11/2005 | Payne et al. | ................. | 442/189 |
| 2006/0024350 A1 * | 2/2006 | Varner et al. | ................ | 424/427 |

FOREIGN PATENT DOCUMENTS

| | | |
|---|---|---|
| JP | 03-255161 | 11/1991 |
| JP | 03-258850 | 11/1991 |
| JP | 2002-321314 | 11/2002 |
| WO | WO 02/28961 A1 * | 4/2002 |

* cited by examiner

*Primary Examiner*—Jeffrey C Mullis
(74) *Attorney, Agent, or Firm*—J.C. Patents

(57) ABSTRACT

An antistatic resin composition and molded products therefrom are described, having good antistatic effect and mechanical strength regardless the type of the molding method. The composition includes a thermoplastic resin (A) and an antistatic agent (B), wherein a refractive index difference between (A) and (B) is not more than 0.02. The antistatic agent (B) includes at least one material selected from the group consisting of (B1) and (B2). (B1) is a polyetheresteramide derived from a polyamide having a Mn of 200-5000 and an alkyleneoxide adduct of bisphenol having a Mn of 300-5000. (B2) is a block polymer having a structure such that blocks of a polyolefin and blocks of a hydrophilic polymer having an volume resistivity of $10^5$-$10^{11}$ Ω·cm are bonded together alternately and repeatedly via at least one bonding mode selected from the group consisting of ester bonding, amide bonding, ether bonding, imide bonding and urethane bonding.

18 Claims, No Drawings

ANTISTATIC RESIN COMPOSITION

CROSS-REFERENCE TO RELATED APPLICATION

This application claims the priority benefit of Japan application serial no. 2003-308063, filed on Aug. 29, 2003.

BACKGROUND OF THE INVENTION

1. Field of the Invention

The present invention relates to an antistatic resin composition. More particularly, the present invention relates to an antistatic resin composition, and resin molded products molded from the antistatic resin composition that have permanent antistatic effect and good mechanical strength.

2. Description of the Related Art

In the prior art, one method to make a thermoplastic resin have permanent antistatic effect is to add polymer having a polyoxyalkylene chain into the resin. Such a method is described in, for example, Japanese Patent Application Laid Open No. Hei 03-255161, Hei 03-258850 or 2002-321314.

However, in any of the above methods, the molded product may sometimes have no antistatic property or low mechanical strength, depending on the type of the molding method used.

SUMMARY OF THE INVENTION

Accordingly, one object of this invention is to provide a resin molded product excellent in permanent antistatic effect and mechanical strength regardless the type of the molding method used.

To solve the above issue, the inventors have studied a lot and thereby completed this invention. This invention provides an antistatic resin composition including thermoplastic resin (A) and an antistatic agent (B) having a hydrophilic chain, wherein a difference between refractive indexes of (A) and (B) is not more than 0.02. This invention also provides an antistatic resin molded product molded from the composition, and a multi-layer film including a laminate of a film as the above molded product and a base film made from thermoplastic resin. This invention further includes a molded article including an above molded product to which coating and/or printing is applied, and a housing material, container material, packing material, covering material, flooring material or tape material formed from the above molded product. In addition, a method for making thermoplastic resin (A) have antistatic property is also described, wherein an antistatic agent (B) including at least one material selected from the group consisting of (B1) and (B2) is added into the thermoplastic resin (A). (B1) is a polyetheresteramide derived from a polyamide (b11) having a number average molecular weight of 200-5000 and an alkyleneoxide adduct (b12) of bisphenol having a number average molecular weight of 300-5000. (B2) is a block polymer which has a structure such that blocks of a polyolefin (b21) and blocks of a hydrophilic polymer (b22) having an volume resistivity of $10^5$-$10^{11}$ Ω·cm are bonded together alternately and repeatedly via at least one bonding mode selected from the group consisting of ester bonding, amide bonding, ether bonding, imide bonding and urethane bonding.

The resin molded products molded from the antistatic resin composition of this invention are very useful for having the following effects. Firstly, the resins are excellent in permanent antistatic effect and mechanical strength. Secondly, the excellent permanent antistatic effect of the molded products does not depend on the type of the molding method used, such as, injection molding, extrusion film-molding or biaxially orientated film-molding. Thirdly, the difference between surface resistivity and volume resistivity is small, and the permanent antistatic effect is excellent not only on the surface but also in the direction of the thickness.

DESCRIPTION OF THE PREFERRED EMBODIMENTS

The thermoplastic resin (A) used in this invention can be vinyl resin (A1) like polyolefin resin (A11), polyacryl resin (A12) and polystyrene resin (A13), polyester resin (A2), polyamide resin (A3), polycarbonate resin (A4), polyacetal resin (A5), modified polyphenyleneether resin (A6), biodegradable resin (A7), or a mixture of two or more species among (A1)-(A7).

In consideration of the dispersability of the antistatic agent (B) in (A), thermoplastic resin (A) preferably includes one, or two or more, resins selected from the group consisting of (A1), (A2), (A3) and (A4), more preferably includes (A1) and/or (A3), and particularly preferably includes (A11) and/or (A13).

(A1) may be formed through (co)polymerization of one or more ethylene-based unsaturated monomers. The monomers include the following species (a1)-(a7).

Species (a1) is unsaturated hydrocarbon (abbreviated to HC hereinafter), including the following species (a11)-(a13). Species (a11) is aliphatic HC having a carbon number of 2-18 (C2-18) or more, and can be an alkene compound, such as, ethylene, propylene, (iso)butene, pentene, 4-methyl-1-pentene, heptene, diisobutylene, octene, dodecene, octadecene and other α-olefin; or a diene compound, such as, butadiene, isoprene, 1,4-pentadiene, 1,6-hexadiene, 1,7-octadiene or 1,11-dodecadiene. Species (a12) is alicyclic HC of C4-18 or more, such as, (di)cycloalkene like cyclohexene, (di)cyclopentadiene, pinene, limonene, indene, vinylcyclohaxene and ethylidene bicycloheptene. Species (a13) is aromatic HC of C8-20 or more, such as, styrene or its homologs like α-methylstyrene, 2,4-dimethylstyrene, ethylstyrene, isopropylstyrene, butylstyrene, phenylstyrene, cyclohexylstyrene, benzylstyrene, vinyltoluene, crotylbenzene, polyvinyl aromatic HC (e.g., divinylbenzene, divinyltoluene, divinylxylene and trivinylbenzene), vinylnaphthalene, and halogenated styrene (e g., chlorostyrene).

Species (a2) is alkyl (meth)acrylate having an alkyl group of C1-50, such as, methyl, ethyl, propyl, butyl, 2-ethylhexyl, dodecyl, hexadecyl, heptadecyl and eicosyl. Species a3 is a vinyl monomer having a carboxyl group, including the following species (a31)-(a34). Species (a31) is unsaturated monocarboxylic acid of C3-18 that is aliphatic or alicyclic or has an aromatic ring, such as, (meth)acrylic acid, (iso)crotonic acid, cyclohexene monocarboxylic acid or cinnamic acid. Species (a32) is unsaturated dicarboxylic acid or its anhydride, such as, an aliphatic one of C4-18 like maleic acid (anhydride), fumaric acid, itaconic acid (anhydride), citraconic acid (anhydride), methaconic acid and allylmalonic acid; an alicyclic one of C7-24 like 4-cyclohexene-1,2-dicarboxylic acid; and one of C8-24 having an aromatic ring, like phenylmaleic acid. Species (a33) is dicarboxylic acid monoester, which can be monoalkyl (C1-8 or more) ester of dicarboxylic acid (a32) like maleic acid, fumaric acid, itaconic acid or citraconic acid. Species (a34) is a salt of (a31), (a32) or (a33), such as, salt of alkaline metal like lithium, sodium and potassium; salt of alkaline earth metal like calcium and magnesium; salt of ammonium; salt of amine of C2-24; or salt of quarternary ammonium of C4-24.

Species (a4) is unsaturated monomer containing carbonyl, ether and/or sulfur, including the following species (a41)-(a45), wherein (a41) is unsaturated ester including the following species (a411) and (a412). Species (a411) is unsaturated ester of carboxylic acid, wherein the carboxylic acid may be aliphatic or aromatic mono- or poly-carboxylic acid and the unsaturated group may be vinyl, isopropenyl, (meth)allyl or vinylphenyl. As aliphatic unsaturated ester of C4-15, the vinyl ester may be vinyl acetate, vinyl propionate, vinyl butyrate, vinyl methoxyacetate or vinyl benzoate; the isopropenyl ester may be isopropenyl acetate; and the (meth)allyl ester may be diallyl adipate. The aromatic unsaturated ester of C9-20 may be diallyl phthalate, methyl-4-vinylbenzoate or acetoxystyrene.

Species (a412) is unsaturated carboxylic acid ester excluding the above species (a2), including the following species (a4121) and (a4122). Species (a4121) is (cyclo)alkyl ester of unsaturated monocarboxylic acid (a31) excluding (meth)acrylic acid, having a straight, branched or alicyclic (cyclo) alkyl group of C1-22; cycloalkyl (meth)acrylate; or di(cyclo) alkyl ester of unsaturated dicarboxylic acid (a32) like alkyl (iso)crotonate, cyclohexyl (meth)acrylate, or dialkyl phthalate or maleate. Species (a4122) is ester of unsaturated carboxylic acid (a31 or a32), having a (poly)oxyalkylene group with polymerization degree of 1-30, wherein the carbon number of the alkylene moiety is 2-4. Examples of (a4122) include mono- or di(meth)acrylate of divalent alcohol (e.g., alkyleneglycol of C2-12) like hydroxyethyl (meth)acrylate; and mono- or di(meth)acrylate of polyetherdiol. The polyether diol may be polyalkylene glycol having a molecular weight of 106 to 1000, wherein 1000 is a number average molecular weight (Mn) that is measured using particularly, but not limited to, a gel permeation chromotography (GPC) method, wherein the GPC apparatus used can be HLC-8220 manufactured by Tosoh Corporation. The polyalkylene glycol may be polyethylene glycol (Mn=300) or polypropylene glycol (Mn=500); or polyoxyalkylenediol having an aromatic ring, such as, an ethyleneoxide (EO) or propyleneoxide (PO) adduct of bisphenol A. Examples of (a4122) also include (meth)acrylate of the above polyether monool, and corresponding (iso)crotonate, fumarate and maleate, wherein the polyether monool is, for example, polyoxyalkylene monool synthesized by adding alkyleneoxide (AO) units to a starting agent having one active hydrogen atom like monovalent alcohol or phenol, wherein the AO unit may be one of C2-12, such as EO, PO, 1,2-, 2,3-, or 1,4-butyleneoxide. Such polyoxyalkylene monool may be polyoxyalkylenealkyl (C1-18) ether, such as, the adduct of methyl alcohol with 10 EO units, or the adduct of lauryl alcohol with 30 EO units.

Species (a42) is unsaturated ether, including species (a421), (a422) and (a423). Species (a421) is aliphatic alkenyl or alkadienyl ether of C3-20, such as, vinyl ether (VE), alkenyl ether (e.g., VE) having a (poly)oxyalkylene chain with a polymerization degree of 1-30, methoxybutadiene, and (meth)allyl ether. The vinyl ether may be alkyl vinyl ether, wherein the alkyl is of C1-10 including methyl, ethyl, propyl, butyl or 2-ethylhexyl. The oxyalkylene unit in the above alkenyl ether may be of C2-4, while the alkenyl ether may be (poly)alkoxyalkyl vinyl ether with alkoxy of C1-6 and alkyl of C1-4, such as, 2-methoxyethyl vinyl ether, 2-butoxyethyl vinyl ether, 2-butoxy-2'-vinyloxy diethyl ether and 2-ethylmercaptoethyl vinyl ether. The (meth)allyl ether may be poly(meth)allyloxyalkane with a polymerization degree of 2-4 and an alkane moiety of C2-6, such as, di-, tri-, or tetra(meth)allyloxyethane, tetra(meth)allyloxy-propane and tetra(meth)allyloxybutane. Species (a422) is aromatic unsaturated ether of C8-20, such as phenyl vinyl ether or phenoxystyrene. Species (a423) is polycyclic unsaturated ether, such as, 3,4-dihydro-1,2-pyran.

Species (a43) is vinyl ketone, such as, aliphatic vinyl ketone of C4-25 and aromatic vinyl ketone of C9-21 like methyl vinyl ketone, ethyl vinyl ketone, divinyl ketone and phenyl vinyl ketone. Species (a44) is a monomer of C4-20 containing sulfide bond, which can be a sulfide corresponding to (a42), such as, divinyl sulfide, p-vinyl diphenyl sulfide and vinyl ethyl sulfide.

Species (a45) is a monomer of C4-25 containing sulfonyl group, including species (a451) and (a452). Species (a451) is unsaturated sulfone or sulfoxide, such as, vinyl ethyl sulfone, divinyl sulfone and divinyl sulfoxide. Species (a452) is unsaturated sulfonic acid, such as, alkenesulfonic acid like vinylsulfonic acid and (meth)allylsulfonic acid; unsaturated aromatic sulfonic acid like styrenesulfonic acid and α-methylstyrenesulfonic acid; alkenyl ester or alkylalkenyl (alkyl: C1-18) ester of sulfocarboxylic acid (e.g., α-sulfoalkanoic acid or sulfosuccinic acid), such as, methylvinyl sulfosuccinate, propyl(meth)allyl sulfosuccinate and stearyl (meth)allyl sulfosuccinate and (meth)allyl sulfolaurate; sulfo (hydroxy)alkyl (meth)acrylate or corresponding (meth) acrylamide, such as, sulfoethyl or sulfopropyl (meth) acrylate, 3-(meth)acryloyloxy-2-hydroxypropanesulfonic acid, 2-(meth)acrylamide-2-methylpropanesulfonic acid, and 3-(meth)acrylamide-2-hydroxypropanesulfonic acid.

Species (a5) is an unsaturated monomer of C5-30 containing phosphorous, including species (a51), (a52) and (a53). Species (a51) is an unsaturated monomer containing phosphoric acid group, such as, (meth)acryloyloxyalkyl (alkyl: C1-24) mono- or di-phosphate like 2-(meth)acryloyloxyethyl phosphate and phenyl-2-(meth)acryloyloxyethyl phosphate. Species (a52) is an unsaturated monomer containing phosphonic acid group, such as, (meth)acryloyloxyalkane (alkane: C1-24) phosphonic acid like 2-acryloyloxyethyl phosphonic acid. Species (a53) includes salts of (a51) and (a52), wherein the metal ions can be the same as those mentioned in the descriptions of (a34).

Species (a6) is a monomer containing nitrogen, including species (a61), (a62), (a63), (a64) and (a65). Species (a61) is a monomer containing amide group, such as, (meth)acrylamide monomer of C3-20 including (meth)acrylamide but excluding species (a7) described later; N-alkyl(meth)acryamide with alkyl of C1-6 like N-methyl(meth)-acrylamide, N-butyl (meth)acrylamide, diacetone acrylamide and N,N'-methylene-bis(meth)acrylamide; N,N-dialkyl- or N,N-diaralkyl-(meth)acrylamide with alkyl of C1-6 and aralkyl of C7-15 like N,N-dimethylacrylamide or N,N-dibenzylacrylamide; a vinyl monomer of C4-20 containing amide group excluding the above (meth)acrylamide monomer, like methacrylformamide, N-methyl-N-vinylacetoamide, cinnamic acid amide, cyclic amide (e.g., N-vinylpyrrolidone) and vinyl monomer containing quarternary ammonium group. Such a vinyl monomer is, for example, a quarternarized product of a vinyl monomer containing tertiary amino group like dimethylaminoethyl(meth)acrylamide and diethylaminoethyl(meth) acryl-amide, etc., wherein the quarternarizing agents include methylchloride, dimethylsulfuric acid, benzylchloride and dimethylcarbonate.

Species (a62) is (meth)acrylate monomer of C5-20, such as, (meth)acrylate containing primary or secondary amino group like aminoalkyl (meth)acrylate with alkyl of C1-6 (e.g., aminoethyl(meth)acrylate) and alkylaminoalkyl(meth)acrylate with alkyl of C1-6 (e.g., t-butylaminoethyl methacrylate); (meth)acrylate containing tertiary amino group like dialkylaminoalkyl(meth)acrylate with alkyl of C1-4 (e.g., dimethylamino-ethyl (meth)acrylate, diethylaminoethyl (meth)acrylate, di-t-butylaminoethyl methacrylate and morpholinoethyl(meth)acrylate); and (meth)acrylate containing quarternary ammonium group like a quarternarized product of a (meth)acrylate containing tertiary amino group (e.g., dimethylaminoethyl(meth)acrylate and diethyl-aminoethyl (meth)acrylate). The usable quarternarizing agents are those mentioned above.

Species (a63) is a monomer containing multiple rings, such as, a pyridine compound of C7-14 like 4-vinylpyridine and 2-vinylpyridine; an imidazole compound of C5-12 like N-vinylimidazole; and a pyrrole compound of C6-13 like N-vinylpyrrole. Species (a64) is a monomer of C3-15 containing nitrile group, such as, (meth)acrylonitrile, cyanostyrene and cyanoalkyl acrylate with alkyl of C1-4. Species (a65) includes other monomers containing nitrogen, such as, monomers of C8-16 containing nitro group like nitrostyrene.

Species (a7) includes monomers containing hydroxyl group, including species (a71), (a72), (a73), (a74) and (a75). Species (a71) includes styrene-based monomers of C8-15, such as, hydroxystyrene. Species (a72) includes (meth)acrylamide-based monomers of C4-10, such as, N-methylol (meth)acrylamide. Species (a73) is unsaturated carboxylic acid ester of C5-12, such as, hydroxyalkyl(meth)acrylate with alkyl of C1-6 like hydroxyethyl(meth)acrylate and hydroxypropyl(meth)acrylate; a monomer containing hydroxyl group that has a polyoxyalkylene chain with a polymerization degree of 2-30 and an alkylene moiety of C2-4, like polyoxyalkylene mono(meth)acrylate (e.g., polyoxyethylene mono(meth)acrylate with 10 oxyethylene units); (di) ester of unsaturated polyoxyalkylene carboxylic acid with 2-30 oxyalkylene units and an alkylene moiety of C2-4, like polyoxyethylene maleic acid (di)ester with 10 oxyalkylene units; polyoxyalkylene (meth)allyl ether with 2-30 oxyalkylene units and an alkylene moiety of C2-4, like polyoxyethylene (meth)allyl ether with 10 oxyethylene units.

Species (a74) is alcohol of C-3-8, such as, (meth)allyl alcohol, crotyl alcohol, isocrotyl alcohol, 1-butene-3-ol and 2-butene-1,4-diol. Species (a75) is ether of C5-20 having hydroxyl group, such as, hydroxyalkyl alkenyl ether with alkyl of C1-6 and alkenyl of C3-6, like 2-hydroxyethyl propenyl ether and allyl ether of polyol. The polyol is one of C2-20 having 2-8 or more hydroxyl groups, such as, ethylene glycol, glycerin, glucose and sucrose, and the allyl ether of polyol may be sucrose allyl ether.

Polyolefin resin (A11) may include a (co)polymer of one or more monomers among the above ethylene-based unsaturated monomers (a11), such as, polyethylene (i.e., PE resin); polypropylene [i.e., (transparent) PP resin]; ethylene/propylene copolymer with a copolymerization weight ratio of 99.9/0.1 to 0.1/99.9; a random and/or block copolymer of ethylene and/or propylene and at least one other α-olefin of C4-12 with a copolymerization weight ratio of 99/1 to 5/95; a copolymer of the monomers of (a11) and (a411), like ethylene/vinyl acetate copolymer (EVA) with a copolymerization weight ratio of 95/5-60/40; a copolymer of the monomers of (a11) and (a2) like ethylene/ethyl acrylate copolymer (EEA) with a copolymerization weight ratio of 95/5-60/40; and mixtures thereof. In consideration of the moldability of the later-described resin composition (abbreviated to resin composition hereinafter), the preferable ones among the above materials are (co)polymers of the monomers of (a11), wherein the more preferable ones include polyethylene, polypropylene, ethylene/propylene copolymer, and random and/or block copolymer of ethylene and/or propylene and at least one other α-olefin of C4-12 with a copolymerization weight ratio of 90/10-10/90.

In consideration of the physical properties and antistatic effect of resin of the later-described molded product, the melt flow rate (MFR) of polyolefin resin (A11) is preferably 0.5-150, more preferably 1-100. The MFR of (A11) is measured according to JIS K7210 issued in 1976, wherein the conditions for testing polypropylene include a temperature of 230° C. and a load weight of 2.16 kgf and the conditions for testing polyethylene include a temperature of 190° C. and a load weight of 2.16 kgf Polyacryl resin (A12) may include (co)polymer of one or more acryl monomers like the above monomer (a2) and (meth)acrylonitrile, such as, polymethylmethacrylate (PMMA resin), polymethylacrylate (PMAA resin) and polybutylmethacrylate; and copolymer of one or more among the above monomers and one or more copolymerizable vinyl monomers other than monomers (a13) and the olefin species among monomers (a11). The copolymerization weight ratio of acryl monomer to such a vinyl monomer is preferably 5/95-95/5, in consideration of the moldability of the resin composition and the physical properties of resin of the molded product.

In consideration of the physical properties of the resin mold, the MFR of (A12) is preferably 0.5-150, more preferably 1-100. The MFR of (A12) is measured according to JIS K7210 standard issued in 1976, wherein the conditions for testing polyacryl resin (A12) include temperature of 230° C. and load weight of 1.2 kgf.

Polystyrene resin (A13) may include polymer of monomer (a13) only, or copolymer of monomer (a13) and at least one monomer selected from the group consisting of (meth)acrylate ester, (meth)acrylonitrile and butadiene. Examples of (A13) include: polystyrene (PS resin); polyvinyltoluene; styrene/acrylonitrile copolymer (AS resin) with a copolymerization weight ratio of 70/30 to 80/20; styrene/methylmethacrylate copolymer (MS resin) with a copolymerization weight ratio of 60/40 to 90/10; styrene/butadiene copolymer (HIPS resin) with a copolymerization weight ratio of 60/40 to 95/5; acrylonitrile/butadiene/styrene copolymer [i.e., (transparent) ABS resin] with a copolymerization weight ratio of 20-30/5-40/40-70; and methyl methacrylate/butadiene/styrene copolymer (MBS resin) with a copolymerization weight ratio of 20-30/5-40/40-70.

In consideration of the physical properties and the antistatic effect of resin of the molded product, the MFR of (A13) is preferably 0.5-150, more preferably 1-100. The MFR of (A13) is measured according to JIS K7210 issued in 1976, wherein the conditions for testing polystyrene resin include a temperature of 230° C. and a load weight of 1.2 kgf.

Polyester resin (A2) includes polycondensed polyester and ring-opening polymer of lactone, wherein the former can be a polycondensation product of diol and aliphatic, alicyclic or aromatic-ring-containing dicarboxylic acid of C2-40 and/or its derivative capable of forming ester (e.g., ester of C1-4 alkyl, or anhydride).

Among the above dicarboxylic acids, the aliphatic dicarboxylic acid may have a carbon number of 2-40, preferably 4-20 and more preferably 6-12, and examples thereof include succinic acid, glutaric acid, adipic acid, pimelic acid, suberic acid, azelaic acid, sebacic acid, undecanedicarboxylic acid and dodecanedicarboxylic acid. The alicyclic dicarboxylic acid may have a carbon number of 5-20, preferably 6-18 and more preferably 8-14, and examples thereof include 1,4-cyclohexanedicarboxylic acid, dicyclohexyl-4,4'-dicarboxylic acid and camphoric acid. The aromatic-ring-containing dicarboxylic acid may have a carbon number of 8-20, preferably 8-16 and more preferably 8-14, and examples thereof include ortho-, iso- and tere-phthalic acid, naphthalene-2,6- or naphthalene-2,7-dicarboxylic acid, diphenyl-4,4'-dicarboxylic acid, diphenoxyethanedicarboxylic acid, tolylenedicarboxylic acid, xylylenedicarboxylic acid and alkali metal (e.g., Li, Na and K) salt of 5-sulfoisophthalic acid.

Examples of the above diol include low-molecular diol having a hydroxyl equivalent under 250, wherein the hydroxyl equivalent is defined as a molecular weight based upon the hydroxyl value and is abbreviated to OH equivalent hereinafter. The examples also include polyetherdiol having a hydroxyl equivalence no less than 250, preferably 250-3000, more preferably 350-2500 and particularly preferably 400-2000. Examples of the low-molecular diol include: aliphatic divalent alcohol, such as, alkylene glycol of C2-12, preferably C2-8 and more preferably C2-6, like ethylene glycol, propylene glycol, 1,3- and 2,3-butylene glycol, 1,4-butanediol, 1,2-, 1,3-, 1,4-, 1,5-, 1,6-, 2,3-, 2,4-, 2,5- and 3,4-hexanediol, neopentyl glycol, 2,2-, 2,3-, 2,4-, 2,5-, 3,3- and 3,4-dimethyl-1,6-hexane diol, and 1,12-dodecanediol; alicyclic divalent alcohol of C5-12, preferably C5-10 and more preferably C5-8, like cyclopentane-1,2- and cyclopentane-1,3-diol, cyclohexane-1,2-, cyclohexane-1,3- and cyclohexane-1,4-diol, bis(hydroxymethyl)cyclohexane, or bisphenol A added with hydrogen; and aromatic-ring-containing divalent alcohol of C8-20 like xylylene glycol, bis(hydroxymethyl)-benzene and bis(hydroxyethyl)benzene.

The above polyetherdiol can be an adduct of the above low-molecular diol with AO units of C2-4, or an adduct of divalent phenol with AO units of C2-4. Examples of the divalent phenol include: monocyclic phenol of C6-16 like hydroquinone, catechol, resorcinol and urushiol; polycondensed polycyclic phenol of C10-30 like dihydroxynaphthalene and binaphthol; and bisphenol of C12-18 like bisphenol-A, -F and -S.

The above lactone may be one of C6-12, such as, caprolactone, enantolactone, laulolactone or undecanolactone.

Examples of the polycondensed polyester include: aliphatic polyester, such as, polybutylene adipate, polyethylene adipate and poly-ε-caprolactone; alicyclic polyester, such as, polycyclohexanedimethyleneterephthalate; and polyester containing aromatic rings, such as, polyethyleneterephthalate and polybutyleneterephthalate.

Examples of the above ring-opening polymer of lactone include: ring-opening polymers of caprolactone synthesized with adipic acid, terephthalic acid, isophthalic acid or sebacic acid as a molecular-weight regulator; ring-opening polymer of enantolactone synthesized with adipic acid as a molecular-weight regulator; and ring-opening polymer of undecanolactone synthesized with adipic acid as a molecular-weight regulator.

In consideration of the physical properties and antistatic effect of resin of the molded product, the intrinsic viscosity [η] of (A2) is preferably 0.1-4, more preferably 0.2-3.5 and particularly preferably 0.3-3. The intrinsic viscosity is measured using Ubbelohde-1A viscometer under 25° C. with the polymer dissolved in o-chlorophenol in a concentration of 0.5 wt %.

Examples of polyamide resin (A3) include ring-opening polymer (A31) of lactone, self-polycondensed product (A32) of aminocarboxylic acid, and dehydration-polycondensed product (A33) of diamine and dicarboxylic acid; and copolymerized nylon formed from two or more kinds of monomers constituting the above polymerized or polycondensed products.

The lactone for synthesizing (A31) may be one of C6-12, such as, caprolactone, enantolactone, laulolactone and undecanolactone, and (A31) may be Nylon 4, Nylon 5, Nylon 6, Nylon 8 or Nylon 12. The aminocarboxylic acid for synthesizing (A32) may be one of C6-12, such as, ω-aminocaproic acid, ω-aminoenanthic acid, ω-aminocaprylic acid, ω-aminopelargonic acid, ω-aminocapric acid, 11-aminoundecanoic acid and 12-aminododecanoic acid. Accordingly, (A32) may be Nylon 7 formed through polycondensation of aminoenanthic acid, Nylon 11 through polycondensation of ω-aminoundecanoic acid, or Nylon 12 through polycondensation of 12-aminododecanoic acid.

Examples of the dicarboxylic acid for forming (A33) include aliphatic dicarboxylic acid, aromatic (aliphatic) dicarboxylic acid, alicyclic dicarboxylic acid, derivatives of these acids capable of forming amide (e.g., anhydride, or ester with lower alkyl of C1-4), and mixtures of two or more among the above compounds.

The aliphatic dicarboxylic acid may be one of C4-20, such as, succinic acid, glutaric acid, adipic acid, pimelic acid, suberic acid, azelaic acid, sebacic acid, undecanedicarboxylic acid, dodecanedicarboxylic acid, maleic acid, furamic acid and itaconic acid. The aromatic (aliphatic) dicarboxylic acid may be one of C8-20, such as, ortho-, iso-, and terephthalic acid, naphthalene-2,6- and naphthalene-2,7-dicarboxylic acid, diphenyl-4,4'-dicarboxylic, diphenoxyethane dicarboxylic acid, and alkali metal (e.g., Li, Na and K) salt of 3-sulfoisophthalic acid. The alicyclic dicarboxylic acid may be one of C5-20, such as, cyclopropane dicarboxylic acid, 1,4-cyclohexanedicarboxylic acid, cyclohexenedicarboxylic acid and dicyclohexyl-4,4'-dicarboxylic acid. Among the derivatives capable of forming amides, the anhydrides include those of the above dicarboxylic acids, such as, maleic acid anhydride, itaconic acid anhydride and phthalic acid anhydride; and the esters with lower alkyl of C1-4 include esters of the above dicarboxylic acids with lower alkyl, such as, dimethyl adipate, and dimethyl esters of ortho-, iso- and tere-phthalic acid.

The diamine for forming (A33) can be aliphatic, alicyclic or aromatic (aliphatic) diamine. The aliphatic diamine may be one of C2-20, such as, ethylenediamine, propylenediamine, hxamethylenediamine, 1,12-dodecanediamine, 1,18-octadecane-diamine and 1,20-eicosanediamine. The alicyclic diamine may be one of C5-20, such as, 1,4-cyclohexylenediamine, isophorondiamine, 4,4'-diaminocyclohexylmethane and 2,2-bis(4-aminocyclohexyl)propane. The aromatic aliphatic diamine may be one of C7-20, such as, xylylenediamine, bis(aminoethyl)benzene, bis(aminopropyl)benzene and bis(aminobutyl)benzene. The aromatic diamine may be one of C6-20, such as, p-phenylenediamine, 2,4- and 2,6-toluylenediamine and 2,2-bis(4,4'-diamino-phenyl)propane.

Moreover, (A33) may be Nylon 66 as a polycondensed product of hexamethylenediamine and adipic acid, Nylon 610 as a polycondensed product of hexamethylenediamine and sebacic acid, Nylon 69 as a polycondensed product of hexamethylenediamine and azelaic acid, Nylon 612 as a polycondensed product of hexamethylenediamine and dodecanedicarboxylic acid, or Nylon 46 as a polycondensed product of tetramethylenediamine and adipic acid.

The above-exemplified monomers of (A3), i.e, the monomers capable of forming amide, can be used in combination of two or more. In consideration of the antistatic effects, the preferable monomers include caprolactam, 12-aminododecanoic acid and adipic acid/hexamethylenediamine, wherein caprolactam is more preferable.

During the preparation of (A3), a molecular-weight regulator like a dicarboxylic acid or diamine mentioned above can be added. In consideration of the reactivity with diamine, the dicarboxylic acid as a molecular-weight regulator is preferably aliphatic or aromatic dicarboxylic acid, and more preferably adipic acid, sebacic acid, terephthalic acid, isophthalic acid, or sodium salt of 3-sulfoisophthalic acid. On the other hand, in consideration of the reactivity with dicarboxylic acid, the diamine as a molecular-weight regulator is preferably hexamethylenediamine or decamethylenediamine. The addition amount of the molecular-weight regulator relative to the total amount of the amide-forming monomer and the molecular-weight regulator is preferably 2-80%, more preferably 4-75%, in consideration of the antistatic effect and heat resistance of the molded product.

Moreover, considering the physical properties and antistatic effect of resin of the molded product, the MFR of (A3) is preferably 0.5-150, more preferably 1-100. The MFR of (A3) is measured according to JIS K7210 issued in 1976, wherein the conditions for testing polyamide resin include a temperature of 230° C. and a load weight of 0.325 kgf.

Examples of polycarbonate resin (A4) include bisphenol-based polycarbonate (PC) resin, and polymer alloy of the PC resin and ABS resin with a PC/ABS weight ratio of 90/10 to 10/90. The bisphenol may be one of C12-20, such as, bisphenol-A, -F and -S, wherein bisphenol-A is preferable in consideration of the dispersability of (B) in (A4). Such a polycarbonate resin may be a polycondensed product of an above-mentioned bisphenol with phosgene or diphenyl carbonate. In consideration of the physical properties and antistatic effect of resin of the molded product, the MFR of (A4) is preferably 0.5-150, more preferably 1-100. The MFR of (A4) is measured according to JIS K7210 issued in 1976, wherein the conditions for testing polycarbonate resin include a temperature of 280° C. and a load weight of 2.16 kgf.

The polyacetal resin (A5) may be homopolymer of "formaldehyde or trioxane" like polyoxymethylene homopolymer, or copolymer of "formaldehyde or trioxane" and cyclic ether, wherein the cyclic ether may be the above-mentioned AO like EO or PO, or dioxorane. The copolymer may be polyoxymethylene/polyoxyethylene copolymer, such as, polyoxymethylene/polyoxyethylene block copolymer having a weight ratio of 90/10 to 99/1. In consideration of the physical properties and antistatic effect of resin of the molded product, the MFR of (A5) is preferably 0.5-150, more preferably 1-100. The MFR of (A5) is measured according to JIS K7210 issued in 1994, wherein the conditions for testing polyacetal resin include a temperature of 190° C. and a load weight of 2.16 kgf. Moreover, in consideration of the physical properties and antistatic effect of resin of the molded product, the intrinsic viscosity [η] of (A5) is preferably 0.1-4, more preferably 0.2-3.5 and particularly preferably 0.3-3.

Modified polyphenylene ether resin (A6) may include a polymer alloy of polyphenylene ether resin, and at least one resin selected from the group consisting of the aforementioned polystyrene resin, polyamide resin and polyolefin resin. Examples of the polyphenylene ether resin include: poly(2,6-dimethyl-1,4-phenylene) ether, poly(2,6-diethyl-1,4-phenylene) ether and poly(2,6-dipropyl-1,4-phenylene) ether; and poly(2,6-dimethyl-1,4-phenylene) ether, poly(2-methyl-6-propyl-1,4-phenylene) ether and poly(2-ethyl-6-propyl-1,4-phenylene) ether.

As (A6), the polymer alloy of polyphenylene ether and polystyrene resin may be Noryl produced by General Electric Company (GE), that of polyphenylene ether and polyamide resin may be Noryl-GTYX produced by GE, and that of polyphenylene ether and polyolefin resin may be Noryl-PPX produced by GE. In consideration of the physical properties and antistatic effect of resin of the molded product, the MFR of (A6) is preferably 0.5-150, more preferably 1-100. The MFR is measured according to JIS K7210 issued in 1994, wherein the conditions for testing (A6) include a temperature of 280° C. and a load weight of 5.0 kgf.

Examples of biodegradable resin (A7) include: polyhydroxybutyrate, poly-lactic acid, polycaprolactone, polybutylenesuccinate, adipate-modified polybutylenesuccinate, carbonate-modified polybutylenesuccinate, terephthalate-modified polybutylenesuccinate, polyethylenesuccinate, and polyvinylalcohol, etc. Among the examples of (A7), the polyhydroxybutyrate may be Biogreen™ produced by Mitsubishi Gas Chemical Company, Inc., the poly-lactic acid may be Lacea™ produced by Mitsui Chemicals, the polycaprolactone may be Cellgreen™ produced by Daicel Chemical Industries, Ltd., the polybutylenesuccinate may be Bionol™ produced by Showa Highpolymer Co., Ltd., the polyethylenesuccinate may be Runare SE™ produced by Nippon Shokubai Co., Ltd., and the polyvinylalcohol may be Poval™ produced by Kuraray Co., Ltd.

The antistatic agent (B), which has a hydrophilic chain and a refractive index different from that of (A) by 0.02 or less, may include one or more polymers selected from the following group of (B1) to (B8). (B1) is a polyetheresteramide, and (B2) is a block polymer which has a structure such that blocks of a polyolefin (b21) and blocks of a hydrophilic polymer (b22) having a volume resistivity of $10^5$-$10^{11}$ Ω·cm are bonded together alternately and repeatedly via at least one bonding mode selected from the group consisting of ester bonding, amide bonding, ether bonding, imide bonding and urethane bonding. (B3) is a polyetheramideimide, (B4) is an epihalohydrin/AO copolymer, (B5) is a polyether ester, and (B6) is a polyetherurethane. (B7) is methoxypolyethylene glycol/(meth)acrylate copolymer, and (B8) is ethylene/vinyl acetate copolymer containing a polyether chain, such as, an EO-adduct of ethylene/vinyl alcohol copolymer. In consideration of the antistatic effect, the preferable ones among (B1) to (B8) are (B1) to (B5), wherein (B1) and (B2) are more preferable. Here, the hydrophilic chain has a volume resistivity of usually $10^4$-$10^{12}$ Ω·cm and preferably $10^5$-$10^{11}$ Ω·cm.

(B1) can be, for example, the polyetheresteramide as described in Japanese Patent Application Laid Open No. Hei 6-287547 and Japanese Patent No. Hei 4-5691. In consideration of the heat resistance, the polyetheresteramide is preferably one formed from polyamide (b11) and an AO-adduct (b12) of bisphenol. The lower limit of Mn of (b11) is preferably 200 and more preferably 500, and the upper limit is preferably 5000 and more preferably 3000. The lower limit of Mn of (b12) is preferably 300 and more preferably 500, and the upper limit is preferably 5000 and more preferably 4000. Examples of polyamide (b11) include the above-mentioned examples of (A3), as well as polymers formed from two or more kinds of monomers constituting (A3). Among these monomers, in consideration of the antistatic effect, the preferable ones are caprolactam, 12-aminododecanoic acid and adipic acid/hexamethylenediamine, wherein caprolactam is more preferable.

Polyamide (b11) can be prepared through ordinary ring-opening polymerization or polycondensation of an aforementioned amide-forming monomer using one or more dicarboxylic acids of C4-20 as a molecular-weight regulator. Examples of the dicarboxylic acids of C4-20 include those provided in the descriptions of (A3). Among the monomers, in consideration of the antistatic effect, the preferable ones are aliphatic dicarboxylic acids and aromatic dicarboxylic acids, wherein adipic acid, sebacic acid, terephthalic acid, isophthalic acid and sodium salt of 3-sulfoisophthalic acid are more preferable.

The addition amount of the molecular-weight regulator, relative to the total amount with the amide-forming monomer (s), is preferably 2-80 wt % and more preferably 4-75 wt %, in consideration of the antistatic effect and heat resistance of resin of the molded product.

Examples of the bisphenol in (b12) can be those mentioned in the descriptions of (A4), wherein the preferable one is bisphenol A in consideration of the dispersability of (B) in (A). Moreover, the AO unit added to the bisphenol may be one of C2-12, such as, EO, PO, 1,2-, 2,3- and 1,4-butyleneoxide, epoxide of α-olefin of C5-12, styreneoxide and epihalohydrin like epichlorohydrin and epibromohydrin; and a mixture of two or more kinds of AO units mentioned above. Among them, EO is preferable in consideration of the antistatic effect of resin of the molded product.

Moreover, considering the antistatic effect and heat resistance of resin of the molded product, the amount of (b12) in the total amount of (b11) and (b12) is preferably 20-80 wt %, more preferably 30-70 wt %.

The methods for preparing polyetheresteramide (B1) include, but are not limited to, the following methods [1], [2] and [3]. In method [1], an amide-forming monomer is reacted with a dicarboxylic acid as a molecular-weight regulator to form (b11), and then (b12) is added and polymerization is conducted under high temperature of 160-270° C. and reduced pressure of 0.03-3 kPa. In method [2], an amide-forming monomer, a dicarboxylic acid as a molecular-weight regulator and a portion of (b12) are simultaneously loaded into a reaction kettle, and then a reaction is conducted, in presence or absence of water, under high temperature of 160-270° C. and raised pressure of 0.1-1 MPa to form an intermediate product. Thereafter, the intermediate product and the remaining (b12) are polymerized under reduced pressure of 0.03-3 kPa. In method [3], the terminal hydroxyl groups of (b12) are substituted with amino or carboxyl groups, and the substituted (b12) is reacted with polyamide (b11) having carboxyl or amino groups at its terminals. The preferable one among the three methods is method [1], in consideration of the controllability of reaction.

In the above method [3], substitution of the terminal hydroxyl groups of (b12) with amino groups can be done with various methods. In one example, the hydroxyl groups are cyanoalkylated to form terminal cyanoalkyl groups, which are then reduced to amino groups. In such an example, (b12) can be reacted with acrylonitrile first, and then the cyanoethylated product is added with hydrogen. On the other hand, substitution of the terminal hydroxyl groups of (b12) with carboxyl groups can be done with oxidation of an oxidant. For example, the hydroxyl groups of (b12) can be oxidized using chromic acid.

In the polymerization reactions of the above methods [1]-[3], esterfying catalyst can be used. The esterfying catalyst can be antimony catalyst like antimony trioxide, tin catalyst like monobutyl tin oxide, titanium catalyst like tetrabutyl titanate, zirconium catalyst like tetrabutyl zirconate, or metal acetate catalyst like zinc acetate and zirconium acetate. The addition amount of the catalyst relative to the total amount of (b11) and (b12) is preferably 0.1-5 wt %, more preferably 0.2-3 wt %, in consideration of reactivity and physical properties of resin of the molded product.

In addition, considering the heat resistance of (b1) and the moldability of the resin composition, the reduced viscosity ($=\eta_{SP}/C$, C=0.5 wt % in m-cresol solution under 25° C.) of (B1) is preferably 0.5-4, more preferably 0.6-3.

Block polymer (B2) can be the one described in WO-0047652. The block of polyolefin (b21) constituting (B2) can be polyolefin (b211)/(b212)/(b213) having carbonyl (preferably carboxyl groups)/hydroxyl/amino groups at two terminals thereof, or polyolefin (b214)/(b215)/(b216) having a carbonyl (preferably carboxyl groups)/hydroxyl/amino group at one terminal thereof.

Polyolefin (b211) can be formed by introducing carbonyl groups to two terminals of polyolefin (b210), which is preferably based on polyolefin having modifiable terminals that takes an amount of 50 wt % or more, preferably 75 wt % or more and more preferably 80-100 wt %, in (b210). Though polyolefin (b210) is usually a mixture of polyolefin modifiable at two terminals thereof, polyolefin modifiable at one terminal thereof and polyolefin not having any modifiable terminal group, the polyolefin modifiable at two terminals thereof is preferably the main component.

Polyolefin (b210) may contain low-molecular polyolefin, i.e., polymerized polyolefin, obtained through (co)polymerization of one kind of olefin of C2-30 or a mixture of two or more kinds of olefins of C2-30, or low-molecular polyolefin obtained through thermal degradation of high-molecular polyolefin that is formed through (co)polymerization of one or more kinds of olefin of C2-30.

Examples of the olefin of C2-30 include the aforementioned examples of (a11), such as, ethylene, propylene, α-olefin of C4-30 (preferably C4-12 and more preferably C4-10), and diene of C4-30 (preferably C4-18 and more preferably C4-8). In consideration of the mixability of (B) in the resin, the preferably ones among them are olefin of C2-12 and/or diene of C4-8, wherein olefin of C2-10 and/or butadiene are more preferable and ethylene, propylene and/or butadiene are particularly preferable.

The polymerized polyolefin can be easily obtained by (co)polymerizing the above olefin in presence of, for example, radical catalyst, metal oxide catalyst or Ziegler-Natta catalyst. Example of the radical catalyst include di-t-butyl peroxide, t-butyl benzoate, decanol peroxide, lauryl peroxide, peroxy-dicarbobate ester, azo compounds and molybdenum oxide coated on alumina carrier. The metal oxide catalyst can be chromium oxide coated on silica-alumina carrier. The Ziegler-Natta catalyst can be $(C_2H_5)_3Al$—$TiCl_4$ or $(C_2H_5)_3Al$—$TiCl_3$. Moreover, the thermally degraded polyolefin can be easily obtained using the method described in Japanese Patent Application Laid Open No. Hei 3-62804. Among the aforementioned polyolefin, the thermal degraded polyolefin is preferably in consideration of the introducibility of carbonyl groups as modification groups and the availability.

Considering the antistatic effect of resin of the molded product, the Mn of (b210) is preferably 800-20000, more preferably 1000-10000 and particularly preferably 1200-6000. In consideration of the antistatic effect and appearance of resin of the molded product, the number of double bonds in (b210) is preferably 1-40, more preferably 2-30 and particularly preferably 4-20, every 1000 carbon atoms. The average number of double bonds per molecule is preferably 1.1-5, more preferably 1.3-3, particularly preferably 1.5-2.5 and further particularly preferably 1.8-2.2, in consideration of the formability and antistatic effect of the repetition structure. By using the thermal degradation method, low-molecular polyolefin having a Mn of 800-6000 and an average terminal double bond number of 1.5-2 per molecule can be easily obtained, as described in Murata Katsuhide & Makino Tadahiko, *Nippon Kagaku Kaishi*, 1975, p.192.

The conditions for measuring Mn of (b210) include:
Apparatus: high-T gel permeation chromatography
Solvent: o-dichlorobenzene
Standard material: polystyrene
Sample concentration: 3 mg/ml
Immobile phase in column: PLgel MIXED-B
Column temperature: 135° C.

Polyolefin (b211) having carbonyl groups at two terminals thereof may contain one of the following species (b2111), (b2112), (b2113) and (b2114) or a mixture of two or more among them. Species (b2111) is formed by modifying two terminals of (b210) with α,β-unsaturated carboxylic acid (anhydride), which means, hereinafter, α,β-unsaturated carboxylic acid, its ester derivative with alkyl of C1-4, or its anhydride. Species (b2112) is formed by secondarily modifying (b2111) with lactam or aminocarboxylic acid. Species (b2113) is formed by modifying (b210) through oxidation or hydroformylation, and species (b2114) is formed by secondarily modifying (b2113) with lactam or aminocarboxylic acid.

Species (b2111) is formed by modifying two terminals of (b210) with α,β-unsaturated carboxylic acid (anhydride). The α,β-unsaturated carboxylic acid (anhydride) can be one of C3-12, such as, monocarboxylic acid like (meth)acrylic acid; dicarboxylic acid like maleic acid, fumaric acid, itaconic acid and citraconic acid; esters of the above acids with alkyl of C1-4, like methyl(meth)acrylate, butyl(meth)acrylate and diethyl itaconate; and anhydrides of the above acids. Considering the reactivity with (b210), the preferable ones among them are dicarboxylic acids, their alkyl esters and their anhydrides, wherein maleic acid (anhydride) and fumaric acid are more preferable and maleic acid (anhydride) is particularly preferable.

In consideration of the formability and antistatic effect of the repetition structure, the addition amount of α,β-unsaturated carboxylic acid (anhydride) relative to the amount of (b210) is preferably 0.5-40 wt %, more preferably 1-30 wt % and particularly preferably 2-20 wt %.

The modification of polyolefin (b210) with α,β-unsaturated carboxylic acid (anhydride) can be done with the following methods, for example. The α,β-unsaturated carboxylic acid (anhydride) can be added, after being heated, to the terminal double bonds of (b210) in a solution or a melt to cause an ene-reaction. In the solution method, the α,β-unsaturated carboxylic acid (anhydride) is added to (b210) in a hydrocarbon solvent like xylene or toluene, and the reaction is conducted under 170-230° C. in an ambient of inert gas, such as, nitrogen, which is the example of inert gas hereinafter. In the melt method, for example, the α,β-unsaturated carboxylic acid (anhydride) is added to melted polyolefin (b210), and the reaction is conducted under 170-230° C. in an ambient of inert gas. However, in consideration of homogeneity of the reaction, the solution method is preferable.

Species (b2112) is formed by secondarily modifying (b2111) with lactam or amino-carboxylic acid. The lactam can be one of C6-12, preferably C6-8 and more preferably C6, such as, caprolactam, enantolactam, laurolactam and undecanolactam. The aminocarboxylic acid can be one of C2-12, preferably C4-12 and more preferably C6-12, such as, amino acid like glycine, alanine, valine, leucine, isoleucine and phenylalanine, ω-aminocaproic acid, ω-aminoenanthic acid, ω-aminocaprylic acid, ω-aminopergonic acid, ω-aminocapric acid, 11-aminoundecanoic acid, and 12-aminododecanoic acid. In consideration of the reactivity in the secondary modification, the preferable one among the above compounds are glycine and leucine, wherein caprolactam, laurolactam, ω-aminocaprylic acid, 11-aminoundecanoic acid and 12-aminododecanoic acid are more preferable, and caprolactam and 12-aminododecanoic acid are particularly preferable.

The addition amount of the lactam or aminocarboxylic acid relative to the amount of polyolefin (b2111) is preferably 0.5-40 wt %, more preferably 1-30 wt % and particularly preferably 2-20 wt %, in consideration of the formability and antistatic effect of the repetition structure.

The secondary modification of (b2111) with a lactam may be done by adding the lactam to (b2111) after (b2111) is melted and then conducting a reaction under 170-230° C. in an ambient of inert gas. Similarly, the secondary modification of (b2111) with an aminocarboxylic acid may be done by adding the aminocarboxylic acid to (b2111) after (b2111) is melted and conducting reaction under 170-230° C. in an ambient of inert gas.

Species (b2113) is formed by introducing carbonyl groups to (b210) through an oxidation process utilizing oxygen and/or ozone, or through an oxo-process utilizing hydroformylation. The method of introducing carbonyl groups with oxidation may be, for example, the one described in U.S. Pat. No. 3,692,877. The method of introducing carbonyl groups with hydroformylation may be, for example, the one described in *Macromolecules*, Vol. 31, 5, page 943.

Species (b2114) is formed by secondarily modifying (b2113) with a lactam or an amino-carboxylic. Examples of the lactam and the aminocarboxylic acid include those mentioned in the descriptions of (b2112), and the addition amount thereof relative to the weight of (b2113) is the same as above.

In consideration of the heat resistance and the reactivity with later-described hydrophilic polymer (b22), the lower limit of Mn of polyolefin (b211) having carbonyl groups at two terminals thereof is preferably 800, more preferably 1000 and particularly preferably 2500, while the upper limit is preferably 25000, more preferably 20000 and particularly preferably 10000. Moreover, considering the reactivity with (b22), the acid value of (b211) is preferably 4-280 (mgKOH/g, this unit being omitted hereinafter), more preferably 4-100 and particularly preferably 5-50.

Hydrophilic polymer (b22), which is for forming (B2) and has a volume resistivity of $10^5$-$10^{11}$ Ω·cm, can be polyether (b221), hydrophilic polymer (b222) containing polyether, cationic polymer (b223) or anionic polymer (b224). Polyether (b221) can be polyetherdiol (b221-1) or polyetherdiamine (b221-2), or a modified product (b221-3) thereof. Hydrophilic polymer (b222) can be polyetheresteramide (b222-1) including a segment of polyetherdiol (b221-1) as a forming component of the polyether segment, polyetheramideimide (b222-2) having a segment of (b221-1), polyetherester (b222-3) having a segment of (b221-1), polyetheramide (b222-4) having a segment of (b221-2), or polyetherurethane (b222-5) having a segment of (b221-1) or (b221-2). Cationic polymer (b223) can be one having 2-80, preferably 3-60, cationic groups (c2) separated by non-ionic molecular chains (c1). Anionic polymer (b224) can be one having 2-80, preferably 3-60, sulfo-groups formed from necessary constituting monomers including dicarboxylic acid (e1) with sulfo-groups and "diol (b2201) or polyether (b221)".

Among various kinds of polyether (b221), the polyetherdiol (b221-1) can be one formed through an addition reaction of "diol (b2201) or divalent phenol (b2202)" with AO units of C2-12 containing EO as a necessary moiety, such as, the one represented by the following formula:

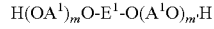

$$H(OA^1)_mO\text{-}E^1\text{-}O(A^1O)_{m'}H$$

wherein $E^1$ is a residue of (b2201) or (b2202) without hydroxyl groups, and $A^1$ is an alkylene group of C2-4. The value of m or m' is an integer of 1-300, preferably 2-250 and more preferably 10-100, wherein m is the same as or different from m'. Moreover, the $OA^1$ groups having a number of "m" and the $A^1O$ groups having a number of "m'" can be the same as or different from each other. Furthermore, when the $OA^1/A^1O$ groups consists of two or more kinds of oxyalkylene groups, different kinds of oxyalkylene groups can be arranged randomly or in blocks.

Diol (b2201) can be a divalent alcohol of C2-12, preferably C2-10 and more preferably C2-8, like aliphatic, alicyclic and aromatic aliphatic divalent alcohols; or a diol of C1-12 having a tertiary amino group. Examples of the aliphatic divalent alcohol include ethylene glycol, propylene glycol, 1,4-butanediol. 1,6-hexanediol, neopentyl glycol and 1,12-dodecanediol. Examples of the alicyclic divalent alcohol include 1,4-cyclohexanediol, 1,4-cyclohexanedimethanol, 1,4-cyclooctanediol and 1,3-cyclopentanediol. Examples of the aromatic aliphatic divalent alcohol include xylylenediol, 1-phenyl-1,2-ethanediol and 1,4-bis(hydroxyethyl)benzene.

The diol having a tertiary amino group can be formed by adding two hydroxyalkyl groups of C1-12 preferably C2-10 and more preferably 2-8) to an aliphatic or alicyclic primary monoamine of C1-12 (preferably C2-10 and more preferably 2-8), or by adding two hydroxyalkyl groups of C1-12 to an aromatic (aliphatic) primary monoamine of C6-12. The adduct of monoamine with two hydroxyalkyl groups can be easily formed through a reaction of the monoamine with an AO of C2-4 like EO, PO and butyleneoxide, or through reaction of the monoamine and hydroxyalkyl halide of C1-12 like 2-bromoethylalcohol or 2-chloropropylalcohol.

Examples of the aliphatic primary monoamine include methylamine, ethylamine, 1- and 2-propylamine, n- and iso-amylamine, hexylamine, 1,3-dimethylbutylamine, 3,3-dimethylbutylamine, 2- and 3-aminoheptane, heptylamine, nonylamine, decylamine, undecylamine and dodecylamine. Examples of the aliphatic primary monoamine include cyclopropylamine, cyclopentylamine and cyclohexylamine. Examples of the aromatic (aliphatic) primary monoamine include aniline and benzylamine.

Divalent phenol (b2202) may be one of C6-18, preferably C8-18 and more preferably C10-15, and examples thereof include monocyclic divalent phenol like hydroquinone, catechol, resorcin and urushiol, bisphenol like bisphenol-A and -F; and condensed polycyclic divalent phenol like dihydroxynaphthalene and binaphthol.

Considering the antistatic effect, the preferable ones among (b2201) and (b2202) are divalent alcohol and divalent phenol, wherein aliphatic divalent alcohol and bisphenol are more preferable and ethyleneglycol and bisphenol A are particularly preferable.

The AO added to diol (b2201) or divalent phenol (b2202), except EO, can be one of C3-12, such as, PO, 1,2-, 1,4-, 2,3- or 1,3-butyleneoxide, or a mixture of two or more among them. If necessary, other AO and substituted AO can be used in combination. Other AO and substituted AO include epoxide of α-olefin of C5-12, styreneoxide, and epihalohydrin like epichlorohydrin or epibromohydrin. The addition amount of other AO and/or substituted AO relative to the total amount of AO is preferably 30 wt % or less, more preferably 25 wt % or less and particularly preferably 20 wt % or less or even 0 wt %, in consideration of the antistatic effect.

Moreover, considering the volume resistivity of hydrophilic polymer (b22), the number of added AO units is preferably 1-300, more preferably 2-250 and particularly preferably 10-100, per hydroxyl group of (b2201) or (b2202). When two or more kinds of AO are added, they can be arranged randomly and/or in blocks.

The AO-addition reaction may be conducted under a temperature of 100-200° C. and a pressure of 0-0.5 MpaG in presence of an alkali catalyst like KOH or NaOH. In consideration of the volume resistivity of hydrophilic polymer (b22) and the dispersability of (B) in (A), the amount of the oxyalkylene units in polyetherdiol (b221-1) relative to the amount of (b221-1) is preferably 5-99.8 wt %, more preferably 8-99.6 wt % and particularly preferably 10-98 wt %. In addition, the amount of oxyethylene units in the polyoxyalkylene chain relative to the weight of the polyoxyalkylene chain is preferably 5-100%, more preferably 10-100%, particularly preferably 50-100% and further particularly preferably 60-100%, in consideration of the volume resistivity of (b22) and the dispersability of (B) in (A).

Polyetherdiamine (b221-2) can be one formed by modifying the hydroxyl groups of polyetherdiol (b221-1) to primary or secondary amino groups, such as, the one represented by the following general formula:

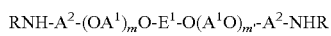

$$RNH-A^2-(OA^1)_m-O-E^1-O(A^1O)_{m'}-A^2-NHR$$

Accordingly, the amount of oxyethylene units in the polyoxyalkylene chain of (b221-2) is the same as in the case of (b221-1), and the amount of oxyalkylene units in (b221-2) is the same as that in (b221-1). In the above formula, $E^1$, $A^1$, m, and m' are defined as above. $A^2$ represents an alkylene group of C2-4, and $A^1$ and $A^2$ can be the same as or different from each other. R represent H or an alkyl group of C1-4, preferably C1 or C2. Moreover, (b221-2) can be easily obtained by modifying two terminal hydroxyl groups of (b221-1) to amino groups with one of various methods. The methods capable of modifying hydroxyl groups to amino groups are exemplified as follows. In one method, the hydroxyl groups of (b221-1) are cyanoalkylated to form terminal cyanoalkyl groups, which are then reduced to amino groups. For example, (b221-1) is firstly reacted with acrylonitrile, and the resulting cyanoethylated product is added with hydrogen. In another method, (b221-1) is reacted with an aminocarboxylic acid or a lactam. In still another method, (b221-1) is reacted with halogenated amine under an alkaline condition.

The modified product (b221-3) of (b221-1) or (b221-2) can be an aminocarboxylic acid-modified product of (b221-1) or (b221-2) that has terminal amino groups, an isocyanate-modified product having the same terminal isocyanate groups, or an epoxy-modified product having the same terminal epoxy groups.

In consideration of the heat resistance and the reactivity with blocks of polyolefin. (b21), the Mn of polyether (b221) is preferably 150-20000, more preferably 300-20000, particularly preferably 1000-15000 and further particularly preferably 1200-8000.

In addition, hydrophilic polymer (b222) having a polyether chain can be the one (b2) described in WO0047652.

Cationic polymer (b223) may have 2-80, preferably 3-60, cationic groups (c2) separated by non-ionic molecular chains (c1), wherein (c2) is a group having, for example, quarternary ammonium salt or phosphonium salt.

The counter anion of (c2) can be an anion of a superacid having a Hammett's acidity function ($-H_0$) of 12-20, or other anion. The superacid can be 1) one derived from combination of a proton acid "(d1)" and a Lewis acid "(d2)", such as, tetrafluoroboric acid and hexafluorophosphoric acid, etc., or 2) a proton acid like perchloric acid, trifluoromethanesulfonic acid and pentafluoroethanesulfonic acid. Other anions include halide ions like $F^-$, $Cl^-$, $Br^-$ and $I^-$, $OH^-$, $PO_4^-$, $CH_3OSO_4^-$, $C_2H_5OSO_4^-$ and $ClO_4^-$.

Examples of (d1) include HF, HCl, HBr and HI, etc., and examples of (d2) include $BF_3$, $PF_5$, $SbF_5$, $AsF_5$ and $TaF_5$, etc. Though any (d1)-(d2) combination can be used, the preferable superacid anions derived from the (d1)-(d2) combinations include $BF_4^-$, $PF_6^-$, $SbF_6^-$, $AsF_6^-$, $TaF_6^-$, $BF_3Cl^-$, $PF_5Cl^-$, $SbF_5Cl^-$, $AsF_5Cl^-$, $TaF_5Cl^-$, $BF_3Br^-$, $PF_5Br^-$, $SbF_5Br^-$, $AsF_5Br^-$, $TaF_5Br^-$, $BF_3I^-$, $PF_5I^-$, $SbF_5I^-$, $AsF_5I^-$ and $TaF_5I^-$, etc., wherein two or more can be used in combination. In consideration of the heat resistance, the preferable ones among these anions are the anions of superacids, wherein $BF_4^-$, $PF_6^-$, $BF_3Cl^-$ and $PF_5Cl^-$ are more preferable and $BF_4^-$ and $PF_6^-$ are particularly preferable.

The non-ionic molecular chain (c1) includes at least one divalent organic group selected from the group consisting of divalent pure hydrocarbon groups, hydrocarbon groups having ether bond, thioether bond, carbonyl bond, ester bond, imino bond, amide bond, imide bond, urethane bond, urea bond, carbonate bond and/or siloxy bond, and divalent hydrocarbon groups having a polycyclic structure containing nitrogen or oxygen atoms. Two or more kinds of such divalent organic groups can be used in combination.

The divalent pure hydrocarbon group can be a straight or branched aliphatic hydrocarbon (alkylene or alkenylene) group of C1-18, preferably C2-8, such as, ethylene, propylene, tetramethylene, hexamethylene, decamethylene, dodecamethylene and 2,2,4-trimethylhexamethylene, etc.; an aromatic hydrocarbon group of C6-20, such as, 1,3- and 1,4-phenylene, 2,4- and 2,6-tolylene, 4,4'- and 2,4'-methylenebisphenylene, m- and p-xylylene, α,α,α',α'-tetramethylxylylene and naphthylene, etc.; or an alicyclic hydrocarbon group of C4-15, such as, cyclohexylene, methylcyclohexylene, 4,4'-methylenebiscyclohexylene, and 2,5- and 2,6-norbornylene.

Examples of the divalent hydrocarbon group having ether bond, thioether bond, carbonyl bond, ester bond, imino bond, amide bond, imide bond, urethane bond, urea bond, carbonate bond and/or siloxy bond include: (poly)oxyalkylene, such as, the residue of the aforementioned polyetherdiol (b22-1) like $-(A^1O)_m-E^1-(OA^1)_{m'}-(E^1, A^1$, m and m' are defined as above), and the residue of a monoetherdiol represented by $-A^1-O-E^1-$ ($E^1$ and $A^1$ are defined as above); a residue of a polythioether corresponding to the above polyoxyalkylene with all oxygen atoms replaced by sulfur atoms; a residue of polyester and/or polyamide, such as, the groups represented by general formulae (1)-(4) blow; a residue of polyurethane and/or polyurea, such as, the group represented by general formula (5) below; a residue of a polycarbonate derived from the aforementioned diol (b2201) and phosgene; and a residue of a polysiloxane that is polyorganosiloxane like polydimethylsiloxane.

In the above formulae (1)-(5), D represents an oxygen atom or an imino group, $R^1$ represents a hydrocarbon group of C1-11, $R^2$ represents a divalent organic group bonded with cationic group, $E^2$ represents a residue of diol (when D is an oxygen atom) or a residue of diamine (when D is an imino group), $E^3$ represent a residue of dicarboxylic acid, $E^4$ represents a residue of organic diisocyanate described later, u or v is 0 or 1, and k is an integer of 1-20. $R^1$ contains a residue of lactam (when D is an imino group) or a residue of lactone (when D is an oxygen atom), wherein examples of the lactam are those mentioned above, and examples of the lactone are those corresponds to the examples of the lactam, such as, caprolactone. $R^2$ represents a divalent hydrocarbon group of C2-12, such as, an alkylene group or an aforementioned (poly)oxyalkylene group like $-A^1-E^1-$ or $-(A^1O)_m-E^1-(OA^1)_{m'}-$.

The diol residue as $E^2$ is a residue of diol without hydroxyl groups, wherein examples of the diol includes: divalent alcohols like aforementioned aliphatic, alicyclic and aromatic divalent alcohols of C2-12; AO-adducts of the above diols, wherein the carbon number of the AO is 2-4 and the number of AO units is 1-20; AO-adducts of divalent phenols like the aforementioned ones of C6-18, wherein the carbon number of the AO is 2-4 and the number of AO units is 2-20; and mixtures of two or more among the above materials.

The diamine residue as $E^2$ is a residue of diamine without amino groups, wherein examples of the diamine include: low-molecular diamines like those corresponding to the aforementioned diisocyanate compounds; aliphatic diamines of C2-20 like ethylenediamine, propylenediamine, hexamethylenediamine and 1,12-dodecanediamine, etc.; alicyclic diamines of C6-15 like 1,4-cyclohexylenediamine, isophoronediamine, 4,4'-diaminocyclohexylmethane, etc.; aromatic aliphatic diamines of C8-15 like xylylenediamine; aromatic diamines of C6-15 like p-phenylenediamine, 2,4- and 2,6-toluenediamine and 2,2-bis(4,4'-diaminophenyl)propane, etc.; the aforementioned polyetherdiamine (b221-2); and mixtures of two or more among the above diamines.

$E^3$ is a residue of dicarboxylic acid without carboxyl groups, wherein examples of the dicarboxylic acid include: aliphatic dicarboxylic acids of C4-12, such as, saturated dicarboxylic acids like succinic acid, adipic acid, glutaric acid, azelaic acid, cebacic acid, undecanedicarboxylic acid

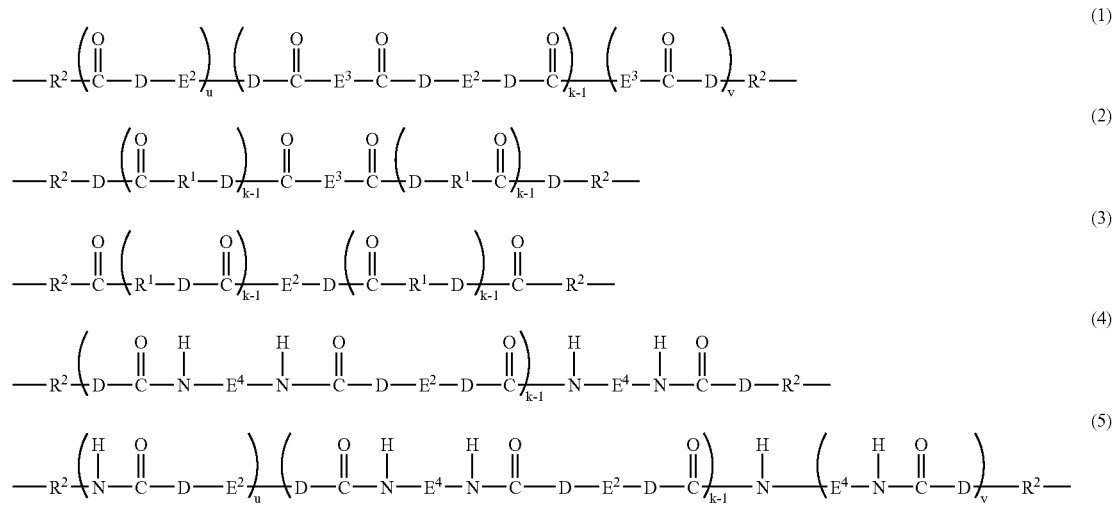

and dodecanedicarboxylic acid, and the aforementioned unsaturated dicarboxylic acids; aromatic dicarboxylic acids of C8-15, such as, phthalic acid, isophthalic acid and terephthalic acid; and mixtures of two or more among the above dicarboxylic acids. $E^4$ is a residue of organic diisocyanate compound without isocyanate groups, wherein examples of the organic diisocyanate compound include the aforementioned aromatic, aliphatic, alicyclic and aromatic aliphatic diisocyanate compounds, modified products of the diisocyanate compounds, and mixtures of two or more among the above materials.

The above-mentioned organic diisocyanate compound can be an aromatic one of C6-20 (the carbon atoms in the NCO groups are not counted, hereinafter), an aliphatic one of C2-18, an alicyclic one of C4-15, an aromatic aliphatic one of C8-15, a modified product of one among the above diisocyanate compounds, or a mixture of two or more among the above compounds. Specific examples of the above aromatic diisocyanate compound include 1,3- and 1,4-phenylenediisocyanate, 2,4- and 2,6-tolylenediiso-cyanate (TDI), non-refined TDI, 2,4'- and 4,4'-diphenylmethanediisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane and 1,5-naphthylenediisocyanate, etc. Specific examples of the above aliphatic diisocyanate compound include ethylenediisocyanate, tetramethylenediisocyanate, hexamethylenediisocyanate (HDI), dodecamethylenedi-isocyanate, 2,2,4-trimethylhexamethylenediisocyanate, lysinediisocyanate, 2,6-diiso-cyanatomethylcaproate, bis(2-isocyanatoethyl)fumarate, bis(2-isocyanatoethyl)carbonate and 2-isocyanatoethyl-2,6-diisocyanatohexanoate, etc.

Specific examples of the above alicyclic diisocyanate compound include isophorondiisocyanate (IPD), dicyclohexylmethane-4,4'-diisocyanate (hydrogen-added MDI), cyclohexylenediisocyanate, methylcyclohexylenediisocyanate (hydrogen-added TDI), bis(2-isocynatoethyl)-4-cyclohexene-1,2-dicarboxylate, and 2,5- and 2,6-norbornanediisocyanate, etc. Specific examples of the above aromatic aliphatic diisocyanate compound include m- and p-xylylenediisocyanate (XDI), α,α,α',α'-tetramethylxylylenediisocyanate (TMXDI), etc. In addition, the above modified products of diisocyanate compounds include urethane-modified products, urea-modified products, carboxyimide-modified products and urethodione-modified products, etc. Among the diisocyanate compounds, the preferable ones are TDI, MDI and HDI, wherein HDI is more preferable.

On the other hand, the molecular weight of the non-ionic molecular chain (c1) is usually 28 to 10000 (Mn), preferably 300-5000. Among various non-ionic molecular chains (c1), the preferable ones are divalent hydrocarbon groups and divalent hydrocarbon groups having ether bond, wherein alkylene groups of C1-8 like hexamethylene, phenylene and (poly) oxyalkylene are more preferable and (poly)oxyethylene and (poly)oxypropylene are particularly preferable.

Cationic polymer (b223) may be one having the repetition unit shown in general formula (6) below:

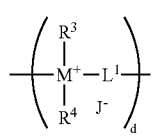

(6)

In general formula (6), M represents a nitrogen atom or a phosphorous atom, J⁻ represents the counter ion, d is an integer of 2-60, $L^1$ represents a non-ionic molecular chain (c1), each of $R^3$ and $R^4$ represents a monovalent non-ionic organic group. Moreover, as in (b223), adjacent $R^3$ groups and/or adjacent $R^4$ groups in general formula (6) may be bonded to each other to form divalent non-ionic organic group $L^3$ and/or $L^5$ as well as one or more rings incorporating M⁺, as shown in general formulae (7) and (8) below.

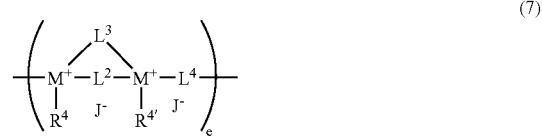

(7)

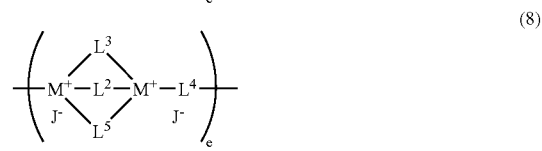

(8)

In formulae (7) and (8), M represents a nitrogen atom or a phosphorous atom, each of $L^2$, $L^3$, $L^4$ and $L^5$ represents a divalent non-ionic molecular chain, each of $R^4$ and $R^{4'}$ represents a monovalent non-ionic organic group, J⁻ represents the counter ion, and e is an integer of 1-30.

Moreover, each of $R^3$, $R^4$ and $R^{4'}$ in general formulae (6) and (7) may have ether bond or ester bond therein, and examples thereof include aliphatic, alicyclic and aromatic monovalent hydrocarbon groups of C1-20, such as, alkyl like methyl, ethyl, octyl and dodecyl, etc.; alkenyl like allyl, 1-butenyl and oleyl, etc.; (substituted) aralkyl like benzyl and 4-methyl-benzyl, etc.; alicyclic hydrocarbon groups like cyclohexyl; alkoxyalkyl with alkoxy of C1-12 and alkyl of C1-20, like methoxyethyl; and acyloxyalkyl with acyloxy of C1-12 and alkyl of C1-20, like acetoxy; etc. In addition, d is usually an integer of 2-60 or more, and, in consideration of the antistatic effect and the reactivity with the aforementioned terminal-modified polyolefin (b211) to (b216), is preferably an integer of 3-50 and more preferably an integer of 5-30.

Moreover, each of $L^1$-$L^5$ may be one of the above non-ionic molecular chains (c1).

The preferable examples of cationic polymer (b223) include those having a repetition unit represented by general formula (6) or (8). The more preferable examples include those represent by general formula (6) wherein each of $R^3$ and $R^4$ is alkyl of C1-8 and $L^1$ is a residue of polyester, while the polyester is particularly preferable the one represented by general formula (2) wherein $R^2$ is alkylene of C2-4, D is an oxygen atom and k is 1. The more preferable examples also include those represent by general formula (8) wherein each of $L^2$, $L^3$ and $L^5$ represents alkylene of C2-8 and $L^4$ represents alkylene of C2-20. The specific examples thereof are those having a repetition unit as shown in formula (9) or (10) below.

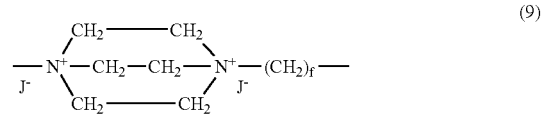

(9)

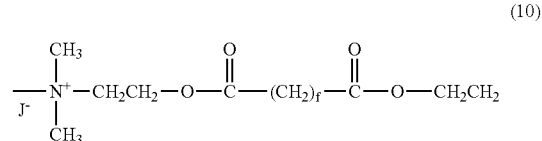

(10)

In the above formulae (9) and (10), J⁻ represents the counter anion, and f is an integer of 2-12.

Other examples of cationic polymer (b3) include those having a repetition unit represented by general formula (11) below.

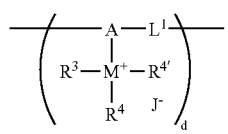

In formula (11), A represents a trivalent hydrocarbon group, and the definitions of M, J⁻, $R^3$, $R^4$ and $R^{4'}$ are the same as above. Examples of the trivalent hydrocarbon group A include: aliphatic ones of C2-20, like —$CH_2(CH_2)_g$CH< (g is 0 or an integer of 1-18); and aromatic ones of C6-12, like a benzene ring bonded at positions (1, 3, 5), (1, 2, 4) or (1, 2, 3). Examples of cationic group (c2) include groups having a quarternary ammonium salt or a phosphonium salt, wherein the groups having a quarternary ammonium salt are preferably divalent polycyclic groups having a quarternary ammonium salt. Examples of divalent polycyclic group having a quarternary ammonium salt include quarternarized products of divalent polycyclic groups having a tertiary amino group, such as, a divalent imidazole ring group like 1,4-imidazolene and 2-phenyl-1,4-imidazolene, etc.; a divalent piperidine ring group like 2,3-, 3,4- or 2,6-piperidylene; and a divalent aromatic polycyclic group like 2,3-, 2,4-, 2,5-, 2,6-, 3,4- or 3,5-pyridylene, 2,5-pyrimidinylene, 3,6-pyridazinylene and 2,5-pyrazinylene, etc.

In consideration of the reactivity with blocks of polyolefin (b21), the terminal groups of cationic polymer (b223) are preferably carbonyl groups, hydroxyl groups or amino groups. Moreover, considering the antistatic effect and the reactivity with the aforementioned terminal-modified polyolefin (b211)-(b216), the Mn of (b223) is preferably 500-20000, more preferably 1000-15000 and particularly preferably 1200-8000.

Anionic polymer (b224) is formed from dicarboxylic acid (e1) with a sulfo-group and "diol (2201) or polyether (b221)" as necessary constituting units, and has 2-80, preferably 3-60, sulfo-groups in one molecule.

Examples of dicarboxylic acid (e1) include: aromatic dicarboxylic acid having a sulfo-group, such as, 5-sulfo-, 2-sulfo- and 4-sulfo-isophthalic acid, 4-sulfo-2,6-naphthalenedicarboxylic acid, and ester-forming derivatives thereof like esters with lower alkyl of C1-4 (e.g., methylester and ethylester, etc.) and acid anhydrides; aliphatic dicarboxylic acid having a sulfo-group, such as, sulfosuccinic acid and ester-forming derivatives thereof like esters with lower alkyl of C1-4 (e.g., methylester OT ethylester, etc.) and acid anhydrides; sulfo-group salts of the above compounds, including alkali metal (e.g., Li, Na and K, etc.) salts, alkaline earth metal (e.g., Mg and Ca, etc.) salts, ammonium salts, and salts of organic amines like mono-, di- and tri-alkylamine with alkyl of C1-4 (e.g., mono-, di- and tri-ethylamine, etc.), amines having a hydroxyalkyl group of C2-4 (e.g., mono-, di- and tri-ethanolamine and diethylethanolamine, etc.) and quarternary ammonium salts of the above amines. In addition, two or more among the above materials can be used in combination. Among the above materials, the preferable ones are aromatic dicarboxylic acids having a sulfo-group, wherein salts of 5-sulfoisophthalic acid are more preferable, including Na- and K-salt of 5-sulfoisophthalic acid.

Among various kinds of diol (b2201) or polyether (b221) constituting anionic polymer (b224), the preferable ones include alkanediol of C2-10, ethylene glycol, polyethylene glycol with a polymerization degree of 2-20, an EO-adduct of bisphenol like bisphenol A with 2-60 EO units, and mixtures of two or more among the above materials. In consideration of the antistatic effect and the reactivity with the aforementioned terminal-modified polyolefin (b211)-(b216), the Mn of (b224) is preferably 500-20000, more preferably 1000-15000 and particularly preferably 1200-8000. In addition, two or more among the above materials as hydrophilic polymer (b22) can be used in any combination of two or more.

The volume resistivity (Ω·cm) of (b22) is measured with a later-described method under an ambient of 23° C. and 50% RH. In consideration of the mechanical properties of resin of the molded product, the lower limit of the volume resistivity of (b22) is preferably $10^5$, more preferably $10^6$ and particularly preferably $10^7$. In consideration of the antistatic effect of resin of the molded product, the upper limit of the volume resistivity of (b22) is preferably $10^{11}$, more preferably $10^{10}$ and particularly preferably $10^9$. Moreover, in consideration of the heat resistance and the reactivity with blocks of polyolefin (b21), the lower limit of Mn of (b22) is preferably 150, more preferably 300, particularly preferably 1000 and further particularly preferably 1200; and the upper limit is preferably 20000, more preferably 18000, particularly preferably 15000 and further particularly preferably 8000.

Block copolymer (B2) has a structure such that blocks of a polyolefin (b21) and blocks of a hydrophilic polymer (b22) are bonded together alternately and repeatedly via at least one bonding mode selected from the group consisting of ester bonding, amide bonding, ether bonding, imide bonding and urethane bonding. In consideration of the antistatic effect and transparency, the preferable ones among various kinds of (B2) include block polymer (B21) incorporating polyether (b221) as (b22), block polymer (B23) incorporating cationic polymer (b223) as (b22), and block polymer (B24) incorporating anionic polymer (b224) as (b22).

In addition, block polymer (B21) has a repetition unit shown in general formula (12) below.

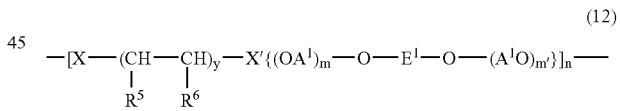

In general formula (12), n is an integer of 2-50, preferably 3-40, more preferably 4-30 and particularly preferably 5-20. One of $R^5$ and $R^6$ represents H, and the other represents H or methyl. In addition, y is an integer of 15-800, preferably 20-500 and more preferably 30-400. $E^1$, $A^1$, m and m' are defined as above, and X and X' are selected from the groups of general formulae (13)-(14) and the groups of corresponding general formulae (13')-(14'), respectively. That is, when X is the group of general formula (13) or (14), X is the group of general formula (13') or (14').

X:

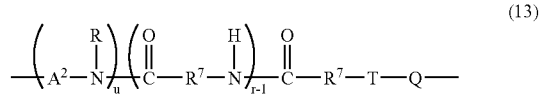

-continued

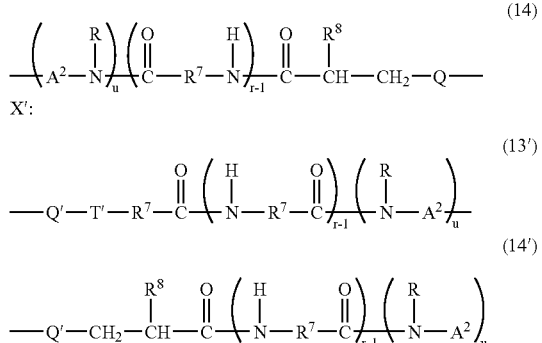

In general formulae (13)-(14) and corresponding general formulae (13')-(14'), R represents H or alkyl of C1-4, preferably C1 or C2, as in the case of (b222). $R^7$ represents a divalent hydrocarbon group of C2-22, preferably C3-16 and more preferably 5-11. $R^8$ represents H or alkyl of C1-10, preferably C1-8 and more preferably C1-6, and r is an integer of 1-20, preferably 1-15 and more preferably 1-10. The value of u is 0 or 1, and groups Q, Q', T and T' are shown below.

Q:

Q':

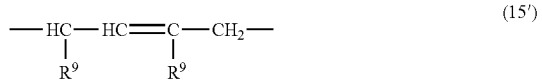

T:

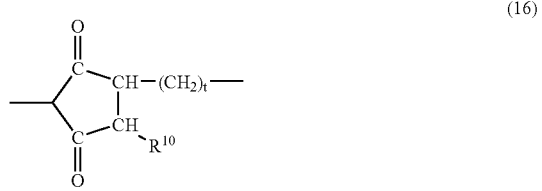

T':

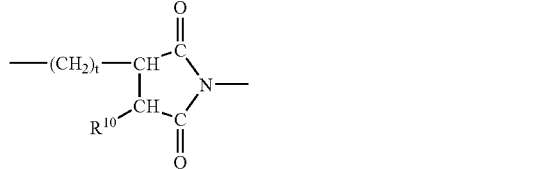

In general formulae (15)-(16) and corresponding general formulae (15')-(16'), $R^9$ represents H or alkyl of C1-10, preferably C1-8 and more preferably C1-6. $R^{10}$ represents H or methyl, and the value of "t" is 1 when $R^{10}$ is methyl, or 0 when $R^{10}$ is H.

In the repetition unit of general formula (12), the polyether segment "$(OA^1)_mO-E^1-O(A^1O)_{m'}$" has a structure derived from the aforementioned polyetherdiol (b221-1) or polyetherdiamine (b221-2), wherein the definitions of $E^1$, $A^1$, m and m' are the same as above.

When X is the group of general formula (13) and X' is the group of general formula (13') in general formula (12), the block polymer shown by general formula (12) contains two components (B211) and (B212). (B211) is obtained through polymerization of the aforementioned terminal-modified polyolefin (b2111) and/or (b2112) and (b221-1), and (B212) is obtained through polymerization of (b2111) and/or (b2112) and (b221-2). (13211) contains (B211-1) as a combination of (b2111) and (b221-1), (B211-2) as a combination of (b2112) and (b221-1), and a mixture of (B211-1) and (B211-2). Similarly, (B212) contains (B212-1) as a combination of (b2111) and (b221-2), (B212-2) as a combination of (b2112) and (b221-2), and a mixture of (B212-1) and (B212-2).

(B211) may be produced with one of the following methods. In one method, (b221-1) is added to (b2111) and/or (b2112), and a polymerization (or polycondensation) reaction is conducted under a reduced pressure and a temperature of usually 200-250° C. In another method, a uni- or bi-axial extruder is used, and a polymerization reaction is conducted under a temperature of usually 160-250° C. with a retention time of 0.1-20 min. The above polymerization reaction can be conducted with various catalysts, such as, Sb catalyst like $SbO_3$, Sn catalyst like monobutyl tin oxide, Ti catalyst like tetrabutyl titanate, Zr catalyst like tetrabutyl zirconate, catalyst of metal-organic acid salt like organic acid salt of zirconium (e.g., zirconium acetate) and zinc acetate, and a mixture of two or more among the above catalysts. The preferable ones among them are Zr catalysts and organic acid salts of Zr, wherein zirconium acetate is more preferable. The addition amount of the catalyst relative to the total amount of (b2111) and/or (b2112) and (b221-1) is preferably 0.001-5 wt %, more preferably 0.01-3 wt %.

(B3211-2) as one kind of (B211) can be produced by secondarily modifying (b2111) with a lactam or an aminocarboxylic acid mentioned before and then adding (b221-1) to the resulting product, or by reacting (b2111) with a lactam or an aminocarboxylic acid in presence of (b221-1), so that the resulting modified product of (b2111) is directly reacted with (b221-1).

(B212) can be produced by the same method for producing (B211), except that the combination of (b2111) and/or (b2112) and (b221-1) for (B211) is replaced by the combination of (b2111) and/or (b2112) and (b221-2). Moreover, (B212-2) as one kind of (B212) can be produced by secondarily modifying (b2111) with a lactam or an aminocarboxylic acid mentioned before and then reacting the resulting modified product with (b221-2).

When X is the group of general formula (14) and X' is the group of general formula (14') in general formula (12), the block polymer shown by general formula (12) contains two components (B213) and (B214). (B213) is obtained through polymerization of (b2113) (r=1) and/or (b2114) (r≧22) and (b221-1), and (B214) is obtained through polymerization of (b2113) and/or (b2114) and (b221-2). (B213) contains (B213-1) as a combination of (b2113) and (b221-1), (B213-2) as a combination of (b2114) and (b221-1), and a mixture of (B213-1) and (B213-2). Similarly, (B214) contains (B214-1) as a combination of (b2113) and (b221-2), (B214-2) as a combination of (b2114) and (b221-2), and a mixture of (B214-1) and (B214-2). In addition, (B213) and (B214) can be produced with the same method of producing (B211) or (B212).

Block polymer (B23) has blocks of cationic polymer (b223), and has a structure including blocks of the aforementioned polyolefin (b21) and (b223) that are bonded alternately. (B23) can be formed through polymerization of (b211)-(b213) and (b223), and the polymerization method can be similar to that of (b2111) and/or (b2112) and (b221) in the case of (B21). Moreover, if required, (b223) and (b221) can also be used in combination in arbitrary ratio, such as, a weight ratio of 1/9 to 9/1. In consideration of the antistatic effect, the number of cationic groups (c2) per molecule in (B23) is preferably 2-500, more preferably 10-300 and particularly preferably 15-250, and the Mn of (B23) corresponding to one group (c2) is preferably 120-30000, more preferably 200-6000 and particularly preferably 300-4000.

Block polymer (B24) has blocks of anionic polymer (b224), and has a structure including blocks of the aforementioned polyolefin (b21) and (b224) that are bonded alternately. (B244) can be formed through polymerization of (b211)-(b213) and (b224), and the polymerization method can be similar to that mentioned in the case of (B21). Moreover, if required, (b224) and (b221) can also be used in combination in arbitrary ratio, such as, a weight ratio of 1/9 to 9/1. In consideration of the antistatic effect, the number of sulfo-groups per molecule in (B24) is preferably 2-500, more preferably 10-300 and particularly preferably 15-250, and the Mn of (B24) corresponding to one sulfo-group is preferably 120-30000, more preferably 200-6000 and particularly preferably 300-4000.

In consideration of the antistatic effect, the amount of (b22) for constituting block polymer (B2) relative to the total amount of (b21) and (b22) is preferably 20-90 wt %, more preferably 25-80 wt % and particularly preferably 30-70 wt %.

Moreover, considering the antistatic effect and the dispersability of (B2) in (A), the Mn of block polymer (B2) is preferably 2000-60000, more preferably 5000-40000 and particularly preferably 8000-30000.

In the structure of (B2), the average repetition number (Nn) of the repetition units including blocks of (b21) and blocks of (b22) is preferably 2-50, more preferably 2.3-30, particularly preferably 2.7-20 and further particularly preferably 3-10, in consideration of the antistatic effect and the dispersability of (B2) in (A). The value of Nn can be derived from the Mn of (B2) and $^1$H-NMR analysis. For example, when (B211) including blocks of (b2111) and blocks of (b221-1) that are alternately bonded to each other is analyzed with $^1$H-NMR, the signal from the protons of the ester moiety [—C(C═O)—OCH$_2$—] is observed at 4.0-4.1 ppm, and the signal from the protons of the polyethylene glycol segments is observed at 3.2-3.7 ppm. The value of Nn can then be derived from the Mn and the integral ratio of the two proton signals.

The terminals of (B2) include carbonyl groups, amino groups, and/or non-modified polyolefin terminals corning from (b21), i.e., polyolefin terminals without any modification, such as, alkyl or alkenyl; or hydroxyl groups and/or amino groups coming from (b22). In consideration of the reactivity, the preferable ones among them include amino group, carbonyl group and hydroxyl group, wherein carbonyl group and hydroxyl group are more preferable.

Polyetheramideimide (B3) can be one having a polyoxyethylene chain that is described in Japanese Patent No. Hei 7-119342 and Japanese Patent Application Laid Open Hei 06-172609. In consideration of the heat resistance, the one derived from (b31), (b32) and (b33) as described below is preferable among various kinds of (B3), wherein (b31) is caprolactam. Species (b32) is trivalent or tetravalent aromatic polycarboxylic acid that can react with amino group to form at least one imide ring. Species (b33) is polyethylene glycol or a mixture of polyethylene glycol in an amount of at least 50 wt % and other polyalkylene glycol. The polyetheramideimide derived from (b31), (b32) and (b33) contains (b33) in an amount of 30-85 wt %, and has a reduced viscosity of 1.5-4 under 30° C.

Species (b32) includes aromatic polycarboxylic acids and anhydrides thereof. The trivalent aromatic polycarboxylic acid (anhydride) can be one of C9-18, and examples thereof include 1,2,4-trimellitic acid, 1,2,5-naphthalenetricarboxylic acid, 2,6,7-naphthalenetricarboxylic acid, 3,3',4-diphenyltricarboxylic acid, benzophenone-3,3',4-tricarboxylic acid, diphenylsulfone-3,3',4-tricarboxylic acid, diphenylether-3,3',4-tricarboxylic acid and anhydrides thereof. The tetravalent aromatic polycarboxylic acid (anhydride) can be one of C10-20, and examples thereof include pyromellitic acid, diphenyl-2,2',3,3'-tetracarboxylic acid, benzophenone-2,2',3,3'-tetracarboxylic acid, diphenyl-sulfone-2,2',3,3'-tetracarboxylic acid, diphenylether-2,2',3,3'-tetracarboxylic acid, and anhydrides thereof.

The Mn of the polyethylene glycol in (b33) is not particularly restricted. However, in consideration of the antistatic effect of (B3) and facility of the production, the Mn of the polyethylene glycol is preferably 500-5000, more preferably 800-3000.

The polyalkylene glycol with alkylene of C3-18 other than polyethylene glycol may have a Mn of 500-5000, and examples thereof include polypropylene glycol, polytetramethylene glycol and modified polyalkylene glycol. The modified polyalkylene glycol may be a polymer added with at least two kinds of AO of C2-10, wherein different AO units are added randomly and/or in blocks. In consideration of the antistatic effect, the preferably AO species include EO, PO, 1,3-propyleneoxide, 2-methyl-1,3-propyleneoxide, 2,2-dimethyl-1,3-propyleneoxide, 1,5-pentamethyleneoxide and 1,6-hexamethyleneoxide.

The equivalence ratio in the reaction of (b32) and (b33) is usually 0.9/1 to 1.1/1, and, in consideration of the mechanical properties of resin of the molded product, is preferably 0.95/1 to 1.05/1.

Moreover, considering the antistatic effect of (B3) and the water resistance of resin of the molded product, the amount of the polyamideimide constituting (B3) is preferably 15-70 wt %, more preferably 30-65 wt %. In addition, considering the heat resistance of (B3) and the mechanical strength of resin of the molded product, the lower limit of the Mn of the polyamideimide in (B3) is preferably 500 and more preferably 800, while the upper limit is preferably 3000 and more preferably 2000.

The method of producing (B3) can be, but is not limited to, the one described below. At first, (b31), (b32) and (b33) are mixed, wherein the equivalence ratio of (b32) to (b33) is usually 0.9/1 to 1.1/1 and preferably 0.95/1 to 1.05/1, and the amount of (b33) relative to the total amount of (b31), (b32) and (b33) is preferably 30-85 wt % and more preferably 35-70 wt % in consideration of the antistatic effect. Polycondensation is then conducted at a temperature of usually 150-200° C. and preferably 180-280° C., with the water content in the resulting polymer kept at 0.1-1 wt %. During the polycondensation reaction, the reaction temperature can be raised step-by-step, and a portion of caprolactam unreacted still remains in the reaction mixture. However, in consideration of the mechanical properties of resin of the molded product, the unreacted caprolactam is preferably removed from the reaction mixture with depressurization distillation. Thereafter, if required, the reaction mixture is further polymerized under a reduced pressure of 0.03-3 kPa and a temperature of 200-300° C., preferably 230-280° C., to form polymer of higher molecular weight.

Moreover, considering the moldability of the resin composition, the reduced viscosity ($\eta_{SP}$/C, C=0.5 wt % in m-cresol solution under 30° C.) of (B3) is preferably 1.5-4, more preferably 1.7-3.5.

Epihalohydrin/AO copolymer (B4) may be one having a polyoxyethylene chain that is described in Japanese Patent No. Hei 7-84564. Examples of the epihalohydrin include epichlorohydrin, epibromohydrin, epiiodohydrin and epifluorohydrin, wherein epichlorohydrin is preferable in consideration of the reactivity and cost. The AO in (B4) may be one of C2-4, such as, EO, PO and tetrahydrofuran. (B4) also includes the copolymer of epihalohydrin and a comonomer including one, or two or more, species selected from the group consisting of 1,2-epoxide monomers (particularly alkyl-glycidyl ether with alkyl of C2-4) and AO (particularly EO and PO). The weight ratio of epihalohydrin to AO is usually 5/95 to 95/5, and, in consideration of the antistatic effect and the dispersability of (B4) in (A), is preferably 10/90 to 60/40. The amount of oxyethylene units in the polyoxyalkylene chain is preferably 5-100 wt %, more preferably 10-100 wt %. In consideration of the antistatic effect and the mechanical properties of resin of the molded product, the copolymer of epichlorohydrin and EO in a weight ratio of 50/50 is preferable among various kinds of (B4).

(B4) can be easily produced through bulk polymerization or solution polymerization using various types of catalyst, such as, an organic aluminum compound like triethyl aluminum, or water/organic aluminum compound catalyst for enhancing the polymerizability. The molar ratio of water to the organic aluminum compound is usually 0.1/1 to 1/1, preferably 0.3/1 to 0.7/1, in consideration of the polymerizability. Moreover, considering the moldability and the mechanical properties of resin of the molded product, the lower limit of the Mn of (B4) is preferably 3000, more preferably 6000; and the upper limit is preferably 100000, more preferably 90000.

Polyetherester (B5) may be one having a polyoxyalkylene chain that is described in Japanese Patent No. Sho 58-19696. (B5) is a polyester having segments that come from polyetherdiol or copolyetherdiol. For example, (B5) can be produced through polycondensation of one or more species among the aforementioned examples of (b12) and (b33) with one or more species among the aforementioned examples of the dicarboxylic acid for constituting (B1) or their ester-forming derivatives. The components (b12) and (b33) are the constituting components of polyetheresteramide (B1) or polyetheramideimide (B3), and the derivatives of the ester-forming dicarboxylic acids may be their esters with lower alkyl of C1-4, or their anhydrides. (B5) may alternatively be produced through an ester-exchange reaction of the above diol component with polyethyleneterephthalate or polybutyleneterephthalate, etc. In consideration of the antistatic effect of (B5) and the moldability of the resin composition, the amount of the polyether segment in (B5) is preferably 30-70 wt %, more preferably 40-60 wt %. The melting point of (B5), which is measured with differential scanning calorimetry (DSC), is preferably 100° C. or higher, more preferably 120-210° C., in consideration of the heat resistance. The amount of oxyethylene units in the polyoxyalkylene chain is preferably 5-100 wt %, more preferably 10-100 wt %.

Polyetherurethane (B6) can be derived from an organic diisocyanate compound, polyetherdiol (b221-1) or polyetherdiamine (b221-2), and, if required, a chain elongating agent. Specific examples of (B6) include those described in Japanese Patent No. Sho 47-35300, Japanese Patent Application Laid Open No. Sho 62-236854 and Japanese Patent No. Hei 3-296565. In consideration of the antistatic effect of (B6) and the moldability of the resin composition, the amount of the polyether segment in (B6) is preferably 30-70 wt %, more preferably 40-60 wt %. The melting point of (B6), which is measured with differential scanning calorimetry (DSC), is preferably 100° C. or higher, more preferably 120-210° C., in consideration of the heat resistance. The amount of oxyethylene units in the polyoxyalkylene chain is preferably 5-100 wt %, more preferably 10-100 wt %.

The difference between the refractive indexes of the thermoplastic resin (A) and the antistatic agent (B) having a hydrophilic chain is 0.02 or less, preferably 0.01 or less, more preferably 0-0.005 and particularly preferably 0-0.003. When the difference in refractive index exceeds 0.02, the transparency of the molded products described later including the molded films is insufficient. Moreover, the species (B1) to (B8) can be used individually or in combination of two or more, if only the refractive indexes of (A) and (B) satisfy the above relationships. Moreover, in this invention, the difference between the refractive indexes of (A) and (B) is defined, hereinafter, as the absolute value of the difference between the refractive indexes of (A) and (B).

The refractive index of each of (A) and (B) can be obtained through theoretical calculation, or by measuring the refractive index of a polymer, which is synthesized by polymerizing the monomer(s) constituting (A) or (B), according to JIS K7105 issued in 1981. In this invention, the refractive indexes are measured with an Abbe's refractometer.

To satisfy the above relationship of refractive-index difference from (B), the refractive index of (A) is preferably 1.480 to 1.550. In the same consideration, a preferable one among such thermoplastic resins (A) contains one, or two or more, species selected from the group consisting of (A1), (A2), (A3) and (A4). On the other hand, to satisfy the above relationship of refractive-index difference from (A), the refractive index of (B1) as one type of (B) is preferably 1.520 to 1.540. In the same consideration, the refractive index of (B2) is preferably 1.498 to 1.515. In addition, to satisfy the above relationships of the refractive-index difference between (A) and (B), the preferable ones among the (A)-(B) combinations with a refractive-index difference of 0.02 or less include: the combinations of (B) and a thermoplastic resin (A) having a refractive index within the above range, and the combinations of (B1) and/or (B2) having a refractive index within the above range and (A). The more preferable combinations are those of (B1) and/or (B2) having a refractive index within the above range and a thermoplastic resin (A) having a refractive index within the above range.

To make the refractive-index difference between (A) an (B) be 0.02 or less, adjusting the refractive index of (B) according to that of (A) is necessary. However, the balance between refractive index and antistatic effect must be considered in the adjustment. Since the antistatic effect and the refractive index are usually negatively correlated, adjusting the refractive index to a required value without degrading the antistatic effect is not so easy. In this invention, the methods of adjusting the refractive index of (B) with certain antistatic effect include the following methods (1) and (2). Method (1) is suitable for adjusting the refractive index of (B) for a thermoplastic resin (A) having a high refractive index of 1.510 to 1.550 or more. In method (1), species (B1) having a relatively higher refractive index among antistatic agents (B) is used. When the refractive index of (B1) is to be adjusted higher, the percentage of (b12) as a hydrophilic part in (B1) is reduced within a range that will not degrade the antistatic effect of (B1). On the contrary, when the refractive index of (B1) is to be adjusted lower, the percentage of (b12) as a hydrophilic part in (D1) is increased within a range that will not degrade the water resistance of the molded product. Moreover, when the refractive index of (B1) is to be adjusted lower, it is also feasible to used (B2) that has a relatively lower refractive index in combination with (B1). Method (2) is suitable for adjusting the refractive index of (B) for a thermoplastic resin (A) having a low refractive index from 1.480 or less to a value less than 1.510. In method (2), species (B2) having a relatively lower refractive index among antistatic agents (B) is used. When the refractive index of (B2) is to be adjusted higher, the percentage of (b22) as a hydrophilic part in (B2) is reduced within a range that will not degrade the antistatic effect of (B2), or the percentage of the highly hydrophilic cationic polymer (b223) or anionic polymer (b224) as one type of (b22) as a hydrophilic part in (B2) is reduced. Moreover, when the refractive index of (B2) is to be adjusted higher, it is also feasible to used (B1) that has a relatively higher refractive index in combination with (B2).

The antistatic resin composition of this invention includes the aforementioned components (A) and (B). Though the percentage of (B) relative to the total amount of (A) and (B) can be varied widely to achieve required performance, the lower limit of the percentage of (B) is preferably 1 wt % and more preferably 1.5 wt % to achieve sufficient antistatic effect, and the upper limit is preferably 50 wt % and more preferably 30 wt % in consideration of the mechanical properties of resin of the molded product.

Moreover, considering the dispersability of (B) in (A) and the antistatic property, the number average grain size of (B) in the antistatic resin composition is preferably 0.05-1 μm, more preferably 0.1-0.5 μm. The number average grain size of (B) is obtained through observation of a scanning electronic microscope (SEM) to the surface of the antistatic resin composition after is extruded from a capillary in a shear rate of $10^3$ $s^{-1}$. More specifically, the number average grain size of (B) can be measured with the following method. At first, the resin composition is heated to a measuring temperature of 200-280° C., wherein the measuring temperature varies with the type of (A). For example, PE resin is heated to 200° C., PP resin and ABS resin to 230° C., PMMA resin to 220° C. and polycarbonate (PC) resin to 280° C. Then, a capillograph is used to extrude the resin composition from a capillary in a shear rate of $10^3$ $s^{-1}$, wherein the capillograph is an apparatus that measures physical properties, such as, the melt viscosity, melt elasticity and melt tension, of melted polymer as it flows out through a capillary (φ1 mm×10 mm) after passing a barrel. One example of the capillograph is Capillograph 1B manufactured by Toyo Seiki Seisaku-Sho, Ltd. The extruded resin composition is taken out and cooled rapidly to room temperature, and then a SEM is used to observe the dispersion pattern of (B) on the surface of the resin composition. The number average grain size of the dispersed antistatic agent (B) is obtained by analyzing the SEM photograph with eyes or an image analyzer. The grain size $dL_m$ (m=1, 2 ... N) of N particles in a certain area of, for example, 10 μm×10 μm, are calculated using the equation:

$dL_m$=(largest long diameter of m-th grain+smallest short diameter thereof)/2 Then, the number average grain size "D" of the dispersed antistatic agent (B) is calculated using the equation: "D=($\Sigma dL_m$)/N. It is shown that the smaller the value of D is, the better the dispersability of (B) in (A) or the compatibility between (A) and (B) is.

In addition, to meet the requirements like further improving the antistatic effect of resin of the molded product, the resin composition of this invention can be added with at least one additive (C) selected from the group consisting of salts (C1) of alkaline metal or alkaline earth metal, surfactants (C2), compatibilizers (C3) and other additives (C4) for resin, provided the effect of this invention is not degraded. The total amount of additive (C) relative to the total amount of (A) and (B) is usually 40 wt % or less, and, in consideration of the mechanical properties of resin of the molded product, is preferably 0.001-30 wt %, more preferably 0.01-25 wt %, particularly preferably 0.2-20 wt % and further particularly preferably 0.5-10 wt %.

Examples of (C1) include: organic acid salts and inorganic acid salts of alkaline metal and alkaline earth metal. The alkali metal may be, hereinafter, Li, Na or K, and the alkaline earth metal may be Mg or Ca hereinafter. The organic acid may be a mono- or di-carboxylic acid of C1-12 like formic acid, acetic acid, propionic acid, oxalic acid and succinic acid; a sulfonic acid of C1-20 like methanesulfonic acid and p-toluenesulfonic acid; or thiocyanic acid. The inorganic acid may be hydrogen halide acid like HCl acid or HBr acid, perchloric acid, sulfuric acid, nitric acid or phosphoric acid.

Specific examples of (C1) include halide salts like LiCl, NaCl, KCl, $CaCl_2$, $MgCl_2$, LiBr, NaBr, KBr, $CaBr_2$, $MgBr_2$, $LiClO_4$, $NaClO_4$ and $KClO_4$, lithium acetate, potassium sulfate, potassium phosphate and potassium thiocyanate. In consideration of the antistatic effect, the preferable ones among various salts (C1) are halide salts and acetate salts, wherein LiCl, NaCl, KCl and $KClO_4$ and potassium acetate are more preferable. The addition amount of (C1) relative to the total amount of (A) and (B) is usually under 5 wt %, and, in consideration of good appearance without eduction of (C1) on resin surface and the antistatic effect of the molded product, is preferably 0.001-3 wt %, more preferably 0.01-2.5 wt %, particularly preferably 0.1-2 wt % and further particularly preferably 0.15-1 wt %. As for the method of adding (C1), it is preferable to disperse (C1) in (B) in advance to prevent degradation of the transparency of the molded product, and is more preferable to add (C1) during the preparation of (B). The timing of adding (C1) is not particularly restricted, and may be before, after or just within the polymerization reaction of (B). It is more preferable that the raw material of (B) before polymerization directly contains (C).

Examples of surfactant (C2) include non-ionic, anionic, cationic and amphoteric surfactants. Examples of non-ionic surfactant include those with EO-addition and those of polyvalent alcohol (C3-60) type. Examples of the non-ionic surfactant with EO-addition include: EO-adducts [molecular weight=158 to 200,000 (Mn)] of higher alcohol of C8-18 (defined hereinafter), higher aliphatic acid of C8-24 (defined hereinafter) or higher alkylamine of C8-24; esters of higher aliphatic acid and polyalkylene glycol [molecular weight=150 to 6,000 (Mn)] as an EO-adduct of glycol; EO-adducts [molecular weight=250 to 30,000 (Mn)] of ester of higher aliphatic acid and polyvalent alcohol of C2-18 with 2-8 or more hydroxyl groups like ethylene glycol, propylene glycol, glycerin, pentaerythritol and sorbitol; EO-adducts [molecular weight=200 to 30,000 (Mn)] of amide of higher aliphatic acid; and EO-adducts [molecular weight=120 to 30,000 (Mn)] of polyvalent alcohol-alkyl ether, wherein the polyvalent alcohol is defined as above and the carbon number of the allyl is 3-60. Examples of the non-ionic surfactant of polyvalent alcohol (C3-60) type include: esters of polyvalent alcohol with aliphatic acid of C3-60; polyvalent alcohol-alkyl ether with alkyl of C3-60); and aliphatic acid (C3-60) alkanolamide.

The anionic surfactants are compounds not including the aforementioned salts (C1), and examples thereof include: carboxylic acid like saturated or unsaturated aliphatic acid and ethercarboxylic acid of C8-22, and salts thereof; sulfate ester salts, such as, sulfate ester salts of higher alcohol like those of aliphatic alcohol of C8-18, and sulfate ester salts of higher alkylether like those of EO-adducts (1-10 EO units) of aliphatic alcohol of C8-18; sulfonate salts of C10-20, such as, alkylbenzenesulfonate salts like sodium dodecylbenzenesulfonate, alkylsulfonate salts, alkylnaphthalene-sulfonate salts, dialkylsulfosuccinate ester surfactants, hydrocarbon (e.g., alkane and α-olefin) sulfonate salts and Igepon-T surfactants; and phosphate ester salts, such as, phosphate ester salts of EO-adducts of higher alcohol of C8-60, and those of EO-adducts of alkylphenol with alkyl of C4-60). In view of the counter cation, the above salts include alkaline metal salts, alkaline earth metal salts, ammonium salts, salts of alkylamine of C1-20 and salts of alkanolamine of C2-12 like mono-, di- and tri-ethanolamine.

The cationic surfactants include, for example, quarternary ammonium salt surfactants and amine salt surfactants. Examples of the quarternary ammonium salt surfactants include: tetraalkylammonium salt with alkyl of C4-100, such as, lauryltrimethylammonium chloride, didecyldimethylammonium chloride, dioctyldimethylammonium bromide and stearyltrimethylammonium bromide; trialkylbenzylammonium salt with alkyl of C3-80, such as, lauryldimethylbenzylammonium chloride (benzalkonium chloride); alkylpyridinium salts with alkyl of C2-60, such as, cetyl-pyridinium chloride; polyoxyalkylenetrialkylammonium salts with alkylene of C2-4, such as, polyoxyethylenetrimethylammonium chloride; and Sapamine-type quarternary ammonium salts, such as, stearamideethyldiethylmethylammonium methosulfate. Examples of the amine salts include: inorganic acid and organic acid (C2-22) salts of higher aliphatic amine of C12-60 like laurylamine, stearylamine, hardened beef tallow amine and rosin amine, wherein the inorganic acid may be hydrogen chloride acid, sulfuric acid, nitric acid or phosphoric acid, and the organic acid of C2-22 may be acetic acid, propionic acid, lauric acid, oleic acid, benzoic acid, succinic acid, adipic acid or azelaic acid; inorganic acid and organic acid salts of EO-adducts of aliphatic amine of C1-30, wherein examples of the (in)organic acid are the same as above; and inorganic acid and organic acid salts of tertiary amine of C3-30, such as, triethanolamine-monostearate and stearamideethyldiethylmethylethanol-amine, wherein examples of the (in)organic acid are the same as above.

Examples of the amphoteric surfactants include: amino acid-type amphoteric surfactants, such as, sodium alkylaminopropionate with an alkylamino group of C8-24; betaine-type amphoteric surfactants, such as, alkyldimethylbetaine with alkyl of C12-18; sulfate ester salt-type amphoteric surfactants, such as, sodium salts of sulfate esters of higher alkylamine of C8-24 and the sodium salt of the sulfate ester of hydroxyethylimidazoline; sulfonate salt-type amphoteric surfactants, such as, pentadecylsulfotaurine and imidazoline-sulfonic acid; and phosphate ester salt-type amphoteric surfactants, such as, phosphate esteramine salts of higher aliphatic acid (C8-24) esters of glycerin.

These surfactants (C2) can be used individually or in combination of two or more. In consideration of the heat resistance of resin of the molded product, the preferable ones among the above surfactants (C2) are anionic surfactants, wherein the sulfonate salts are more preferable and the alkylbenzenesulfonate salts, alkylsulfonate salts and paraffinsulfonate salts are particularly preferable.

The addition amount of (C2) relative to the total amount of (A) and (B) is usually under 15 wt %. To achieve good appearance without education of (C2) on the film surface and to make the mold have antistatic effect, the addition amount is preferably 0.001-12 wt %, more preferably 0.01-10 wt % and particularly preferably 0.1-8 wt %%. As for the method of adding (C2), it is preferable to disperse (C2) in (B) in advance to effectively disperse (C2) in the resin composition, and is more preferable to add (C2) during the preparation (polymerization) of (B). The timing of adding (C2) is not particularly restricted, and may be before, after or just within the polymerization reaction. It is more preferable that the raw material of (B) before polymerization directly contains (C2).

Examples of compatibilizers (C3) include: modified vinyl (co)polymer having at least one kind of polar group selected from the group consisting of carboxyl group, epoxy group, amino group, hydroxyl group and polyoxyalkylene group, such as, the one described in Japanese Patent Application Laid Open No. Hei 3-258850; modified vinyl (co)polymer having sulfonyl groups, such as, the one described in Japanese Patent Application Laid Open No. Hei 6-345927; and block (co)polymer having polyolefin segments and aromatic vinyl polymer segments, such as, the one described in Japanese Patent Application Laid Open No. Hei 6-345927. The above compatibilizers (C3) can be used individually as well as in combination of two or more. In consideration of the transparency of the molded product, the difference between the refractive indexes of (A)/B and (C3) is preferably 0.01 or less, more preferably 0.008 or less and particularly preferably 0.005 or less. The addition amount of (C3) relative to the total amount of (A) and (B) is usually under 15 wt % or less, and, in consideration of the compatibility between (A) and (B) and the mechanical properties of the molded product, is preferably 0.1-12 wt %, more preferably 1-10% and particularly preferably 1.5-8 wt %.

Additive (C4) may contain at least one material selected from the group consisting of nucleating agents (C41), lubricating agents (C42), plasticizers (C43), mold release agents (C44), antioxidants (C45), flame retardants (C46), UV absorbents (C47) and antibacterial agents (C48).

Examples of nucleating agents (C41) includes organic and inorganic nucleating agents. The organic ones include 1,3,2, 4-di-benzylidene sorbitol, aluminum mono-hydroxy-di-p-t-butylbenzoate, sodium bis(4-t-butylphenyl)phosphate and sodium benzoate. The inorganic ones include graphite, carbon black, magnesium oxide, calcium silicate, magnesium silicate, talc, kaolin, calcium carbonate, magnesium carbonate, sodium carbonate, potassium carbonate, zinc oxide, alumina, barium sulfate and calcium sulfate. Examples of lubricating agents (C42) include: wax, such as, carnauba wax, paraffin wax and polyolefin wax; higher aliphatic acid of C8-24, such as, stearic acid, oleic acid, linolic acid and linolenic acid; higher alcohol of C8-18, such as, stearyl alcohol, lauryl alcohol, myristyl alcohol, cetyl alcohol, cetostearyl alcohol and behenyl alcohol; and higher aliphatic acid amide of C8-24, such as, stearic acid amide, oleic acid amide, linolic acid amide and linolenic acid amide.

Examples of plasticizers (C43) includes: aromatic carboxylate esters, such as, phthalate ester like dioctyl phthalate and dibutyl phthalate; aliphatic monocarboxylate esters, such as, methylacetyl ricinolate and triethyleneglycol dibenzoate; aliphatic dicarboxylate esters, such as, di(2-ethylhexyl)adipate and adipic acid-propyleneglycol polyester with a Mn of 200-2000; aliphatic tricarboxylate esters, such as, citrate esters like triethyl citrate; phosphate triesters, such as, triphenyl phosphate; and petroleum resin. Examples of mold release agents (C44) includes: lower alcohol (C1-4) ester of higher aliphatic acid as defined above, such as, butyl stearate; polyvalent (2-4 or more valent) alcohol ester of aliphatic acid of C2-18, such as, hardened caster oil; glycol (C2-8) ester of aliphatic acid of C2-18, such as, ethylene glycol monostearate; and liquid paraffin.

Examples of antioxidants (C45) include phenolic antioxidants, sulfur-based antioxidants, phosphorous-based antioxidants and amine-based antioxidants. Examples of phenolic antioxidants include: monocyclic phenols, such as, 2,6-di-t-butyl-p-cresol and butylated hydroxyanisole; bisphenols, such as, 2,2'-methylenebis(4 methyl-6-t-butylphenol), 4,4'- butylidenebis(3-methyl)-6-t-butylphenol and 4,4'-thiobis(3-methyl)-6-t-butylphenol; and polycyclic phenols, such as, 1,3,5-trimethyl-2,4,6-tris(3,5-di-t-butyl-4-hydroxybenzyl) benzene and 1,1,3-tris(2-methyl-4-hydroxy-5-t-butylphenyl) butane. Examples of sulfur-based antioxidants include: dilauryl-3,3'-thiodipropionate, distearyl-3,3'-thiodipropionate, laurylstearyl-3,3'-thiodipropionate, dimyristyl-3,3'-thiodipropionate, distearyl-β,β'-thiodibutyrate and dilauryl sulfide. Examples of phosphorous-based antioxidants include: triphenyl phosphite, triisodecyl phosphite, diphenylisodecyl phosphite, phenyldiisodecyl phosphite, tris(2,4-di-t-butylphenyl) phosphite, 2,2-methylenebis(4,6-di-t-butylphenyl)octyl phosphite, 4,4'-butylidene-bis(3-methyl-6-t-butylphenylditridecyl) phosphite, cyclic neopentanetetrayl bis(octadecylphosphite), cyclic neopentanetetrayl bis(2,6-di-t-butyl-4-methylphenyl) phosphite, cyclic neopentanetetrayl bis(2,4-di-t-butylphenyl) phosphite and diisodecyl-pentaerythritol diphosphite. Examples of amine-based oxidants include: octylated diphenylamine, N-n-butyl-p-aminophenol, N,N-diisopropyl-p-phenylenediamine, N,N-bis(1-ethyl-3-methylpentyl)-p-phenylenediamine, N,N-diphenyl-p-phenylenediamine, N-phenyl-α-naphthyl-amine, phenyl-β-naphthylamine and phenothiazine.

Examples of flame retardants (C46) include organic and inorganic ones. Examples of the organic ones include: nitrogen-containing flame retardants, such as, salts (inorganic acid salt, cyanuric acid salts and isocyanuric acid salts) of urea compounds, guani-dine compounds and triazine compounds like melamine and guanamine; sulfur-containing flame retardants, such as, sulfate ester, organic sulfonic acid, sulfamic acid, organic sulfamic acid, and salts, esters and amides thereof; silicon-containing flame retardants, such as, polyorganosiloxane; and phosphorous-containing flame retardants, such as, phosphate esters like tricresyl phosphate. Examples of inorganic flame retardants include antimony trioxide, magnesium hydroxide, zinc borate, barium metaborate, aluminum hydroxide, red phosphorous and ammonium polyphosphate.

Examples of UV absorbents (C47) include: benzotriazole-based UV absorbents, such as, 2-(2'-hydroxy-5'-methylphenyl)benzotriazole and 2-(2'-hydroxy-4'-octoxyphenyl)benzotriazole; benzophenone-based UV absorbents, such as, 2-hydroxy-4-methoxy-benzophenone and 2,2'-dihydroxy-4-methoxybenzophenone; salicylate-based UV absorbents, such as, phenylsalicylate and ethyleneglycol monosalicylate; and acrylate-based UV absorbents, such as, 2-ethylhexyl-2-cyano-3,3'-diphenylacrylate.

Example of antibacterial agents (C48) include: benzoic acid, paraoxybenzoate esters, sorbic acid, halogenated phenol like sodium salt of 2,4,6-tribromophenol, organic iodine compounds like 4-chlorophenyl-3-iodo-propargylformal, nitrile compounds like 2,4,5,6-tetrachloroisophthalonitrile, thiocyano-compounds like methylenebisthiano-cyanate, N-haloalkylthioimide like N-tetrachloroethyl-thio-tetrahydrophthalimide, copper agents like 8-oxyquinoline copper, benzoimidazole like 2-4-thiazolylbenz-imidazole, benzothiazol like 2-thiocyanomethylthiobenzothiazole, trihaloallyl like 3-bromo-2,3-diiodo-2-propenylethyl carbonate, triazole like azaconazole, organic nitrogen sulfur compound like Slaoff 39, quarternary ammonium compounds like trimethoxy-silyl-propyloctadecylammonium chloride, and pyridine-based compounds like 2,3,5,6-tetrachloro-4-(methylsulfonyl)-pyridine.

As for the addition amount of (C4) relative to the total amount of (A) and (B), the amount of each of (C41), (C42) and (C44) is usually 10 wt % or less and preferably 1-10 wt %. The amount of each of (C43) and (C46) is usually 20 wt % or less and preferably 1-10 wt %. The amount of each of (C45) and (C47) is usually 5 wt % or less and preferably 0.1-3 wt %, and that of (C48) is usually 3 wt % or less and preferably 0.05-1 wt %.

The molded products of this invention can be molded from the above resin composition with the following processes, including films of 200 μm or less in thickness and molded products exceeding 200 μm in thickness.

1. Fabrication of Molded Products (in the Case of Injection Molding, for Example)

The processes include: <1> a mixing process of (A), (B) and, if required, other additives C; and <2> an injection molding process for fabricating an injection molded product, which is described in details later.

<1> Mixing Process:

The method for mixing components of the resin composition of this invention is not particularly restricted. For example, in method (1), (A) and (B) and, if required, additives (C) are dry-blended with a tumble mixer, a ribbon blender or a Henschel mixer, etc. In method (2), after the above components are dry-blended with the above method, the mixture is further melt-mixed under 200-280° C. in an extrusion machine and made into pellets. In method (3), a master batch resin composition of (A) and (B) is made in advance through melt-mixing under 200-280° C. in an extrusion machine, wherein the amount of (B) is preferably 30-70 wt %. Then, the master batch, (A) and, if required, additives (C) are dry-blended with an aforementioned mixer. In consideration of the dispersability of (B) in (A), the preferable ones among these method are methods (2) and (3), wherein method (2) is more preferably. However, since the compatibility between the components (A) and (B) of the resin composition of this invention is good, a high-quality injection molded product can be obtained even with method (1).

<2> Injection Molding Process:

The injection molding method is not particularly restricted, and any injection molding method that presses melted resin into the gap between female and male dies of a die and then cool-solidifies the resin into a molded product, such as, injection molding, gas-assistant molding, injection-compression molding or injection blow-molding, can be used. Moreover, during the injection molding process, a foaming agent, such as, methyl chloride, butane, $CO_2$ or azobisisobutyronitrile, can be added to form a foaming layer in the molded product, 2. Fabrication of Films Fabrication of a film include the following processes: <1> a mixing process of (A), (B) and, if required, additives (C); <2> a film-forming process; <3> a cooling process using, for example, a roll; and, if required, a drawing process <4>. Moreover, a film made from the resin composition of this invention can serve as a surface layer to be laminated on a base layer to form a multi-layer film. The base layer may include a thermoplastic resin film and/or a film made from the resin composition of this invention.

In the cases with laminating operation, the surface film can be laminated on one or both sides of a base layer. When both sides of the base layer are laminated, the two surface-layer resins on both sides can be the same as or different from each other. Moreover, each side of the base layer can be laminated with multiple (2-6 or more) layers of different resin species, and the base layer itself may be a multi-layer film including multiple repeating units each consisting of a thermoplastic resin film and a film made from the resin composition of this invention. Furthermore, at least one of the surface layer and the base layer can be a multi-layer film formed from foaming layers or from foaming and non-foaming layers. In addition, at least one of the surface layer and the base layer may be a uniaxially or multi-axially orientated multi-layer film.

The film-fabricating process is described below in details:

<1> Mixing Process:

The mixing process may be done with one of the methods (1) to (3) as in the aforementioned mixing process <1> for fabricating a molded product, while the preferable methods are also the same. However, since the compatibility between the components (A) and (B) of the resin composition of this invention is good, high-quality films can be obtained even with method (1).

<2> Film-Forming Process:

The method for forming a film is not particularly restricted, and various method, such as, extrusion molding, inflation molding and tubular molding, can be used. In each of the methods, a film can be extruded directly with the resin composition laminated thereon using a die with coextrusion capability, wherein the surface layer is laminated on the base layer, or the base layer and the surface layer are bonded together with an adhesive or an adhesive layer. A multi-layer film is thus formed. Similarly, a foaming agent as mentioned above can also be added during the film-forming process to form a foaming layer in the film.

In the coextrusion process, for example, the resin composition is heated to its flowing temperature, about 85-280° C., and the temperature of the dies is set to 180-280° C. In the case wherein a surface layer is laminated on a base layer, it is feasible to firstly laminate the layers and then bond them together with heating/pressing. It is also feasible to firstly heat the bonding surfaces of them with a heating apparatus and then bond them together with pressing. In the case wherein two layers are bonded together with an adhesive, the species of the adhesive is not particularly restricted. The adhesive can be ethylene-vinylacetate copolymer or methylmethacrylate polymer elastomer like Tufprene™ and Tuftec™ both produced by Asahi Kasei Corporation, etc.

<3> Cooling Process using, for Example, a Roll:

The cooling method can be one making the film contact with a roll, and such a method can be used in, for example, an extrusion molding process. The cooling method may alternatively be an air-blow cooling method, and such a method can be used in, for example, a inflation molding or tubular molding process.

<4> Drawing Process:

The drawing method can be one that firstly forms a undrawn film and then draws the same in another step, such as, a drawing step utilizing the difference between peripheral velocities of rolls, or a step using a tenter method. It is also feasible to incorporate a drawing operation in the production of a film, and such methods include the inflation molding method and tubular molding method.

In consideration of the antistatic effect, the draw ratio set in any one of the above drawing methods is preferably 2-20 in the case of uniaxial drawing, and is preferably 2-15 in each direction in the case of biaxial drawing. The antistatic resin film of this invention can have better antistatic effect after being treated with a drawing process.

Moreover, the antistatic resin film of this invention can be subjected to a surface treatment like a corona treatment or a flame treatment according to its uses and requirements, wherein the uses may include printing the film and bonding the film to another article, and the requirements may include the fixability to printed ink and the improvement in bonding capability of the film. The surface being treated can be the surface of the antistatic surface layer, or the internal surface of the multi-layer film without an antistatic surface layer thereon, i.e., the surface of the base layer, when only one side of the base layer is laminated with a surface layer.

Moreover, the haze, an indicator of transparency, of the antistatic resin molded products of this invention is preferably 20% or less, more preferably 0-10% and particularly preferably 0-5%, in consideration of the transparency of the same. The haze value can be measured with the method described in JIS K7105 issued in 1981 using, for example, a ND-300A apparatus manufactured by Nippon Denshoku Industries Co., Ltd.

The molded products made from the antistatic resin composition of this invention have superior mechanical properties and permanent antistatic property, as well as good coatability and printability. The methods for coating the molded products include, but are not limited to, air-spray methods, airless spray methods, electrostatic spray methods, dip methods, roller methods and brush-coating methods, etc. The coating materials include various materials, such as, polyester melamine, epoxy melamine, acryl melamine and acrylurethane resin coating material, etc. The thickness of the coated film, after being dried, can be suitably set according to the requirements. However, considering the physical properties of the coated film, the thickness thereof is preferably 10-50 μm, more preferably 15-40 μm. Moreover, the methods for printing the molded products include various methods, such as, gravure printing, flexo-printing, screen printing and offset printing, etc. The usable printing inks include those usually used to print plastic.

The following examples are provided to further explain this invention, but not to restrict the scope of this invention. In the following descriptions, the term "part" means "weight part", and the symbol "%" means "wt %".

Synthesis Example 1

Preparation of Polyetheresteramide (B1-1)

In this example, 66.9 parts of ε-caprolactam, 33.1 parts of adipic acid, 0.3 part of antioxidant (Irganox 1010 produced by Ciba Speciality Chemicals Company, applied hereinafter) and 6 parts of water were added into an autoclave made from stainless steel. The air within the autoclave was then replaced with nitrogen, and the autoclave was closed and the mixture was heated, in the closed system, to 220° C. under a raised pressure of 0.3-0.5 MPa with stirring for 4 hours, to produce 96 parts of polyamide having an acid value of 374 and carboxyl groups at two terminals thereof. Next, 160 parts of polyethyleneglycol (Mn=500) and (0.5 part of zirconium acetate were added into the reaction mixture, and polymerization was conducted under 245° C. and a reduced pressure of 0.13 kPa for 5 hours to produce a viscous polymer. The polymer was taken out on a belt in the form of strand and made into pellets, so that polyetheresteramide (B1-1) was obtained, having a refractive index of 1.505.

Synthesis Example 2

Preparation of Polyetheresteramide (B1-2)

In this synthesis example, polyamide was produced essentially with the same method of Synthesis Example 1, except that 66.9 parts of ε-caprolactam and 33.1 parts of adipic acid were replaced by 83.5 parts of ε-caprolactam and 16.5 parts of terephthalic acid. Thereby, 96 parts of polyamide having an acid value of 112 and carboxyl groups at two terminals thereof was obtained. Next, polyetheresteramide (B1-2) was obtained using essentially the same method of Synthesis Example 1, except that 160 parts of polyethyleneglycol (Mn=500) was replaced by 144 parts of an EO-adduct (Mn=1500) of bisphenol A. The refractive index of (B1-2) was 1.512.

Synthesis Example 3

Preparation of Polyetheresteramide (B1-3)

In this synthesis example, polyamide was produced essentially with the same method of Synthesis Example 1, except that 66.9 parts of ε-caprolactam and 33.1 parts of adipic acid were replaced by 67.1 parts of ε-caprolactam and 32.9 parts of terephthalic acid. Thereby, 96 parts of polyamide having an acid value of 225 and carboxyl groups at two terminals thereof was obtained. Next, polyetheresteramide (B1-3) was obtained using essentially the same method of Synthesis Example 1, except that 160 parts of polyethyleneglycol (Mn=500) was replaced by 57.6 parts of an EO-adduct (Mn=300) of bisphenol A. The refractive index of (B1-3) was 1.526.

Synthesis Example 4

Preparation of Polyetheresteramide (B1-4)

In this synthesis example, 96 parts of polyamide having an acid value of 56.1 and carboxyl groups at two terminals thereof was obtained, using essentially the same method of Synthesis Example 1, except that 66.9 parts of ε-caprolactam and 33.1 parts of adipic acid were replaced by 91.9 parts of 12-aminododecanoic acid and 8.1 parts of terephthalic acid. Next, polyetheresteramide (B1-4) was obtained using essentially the same method of Synthesis Example 1, except that 160 parts of polyethyleneglycol (Mn=500) was replaced by 168 parts of an EO-adduct (Mn=3500) of bisphenol A. The refractive index of (B1-4) was 1.508.

Synthesis Example 5

Preparation of Polyetheresteramide (B1-5)

In this synthesis example, polyamide was produced essentially with the same method of Synthesis Example 1, except that 66.9 parts of ε-caprolactam and 33.1 parts of adipic acid were replaced by 94.5 parts of ε-caprolactam and 5.5 parts of terephthalic acid. Thereby, 96 parts of polyamide having an acid value of 37.4 and carboxyl groups at two terminals thereof was obtained. Next, polyetheresteramide (B1-5) was obtained using essentially the same method of Synthesis Example 1, except that 160 parts of polyethylene glycol (Mn=500) was replaced by 160 parts of an EO-adduct (Mn=5000) of bisphenol A. The refractive index of (B1-5) was 1.511.

Synthesis Example 6

Preparation of Polyetheresteramide (B1-6)

In this synthesis example, polyamide was produced essentially with the same method of Synthesis Example 1, except that 66.9 parts of ε-caprolactam and 33.1 parts of adipic acid were replaced by 96.7 parts of 12-aminododecanoic acid and 3.3 parts of terephthalic acid. Thereby, 96 parts of polyamide having a acid value of 22.4 and carboxyl groups at two terminals thereof was obtained. Next, polyetheresteramide (B1-6) was obtained using essentially the same method of Synthesis Example 1, except that 160 parts of polyethylene glycol (Mn=500) was replaced by 76.8 parts of an EO-adduct (Mn=4000) of bisphenol A. The refractive index of (B1-5) was 1.519.

Synthesis Example 7

Preparation of Acid-Modified Polypropylene (b21-2) and Secondarily Modified Polypropylene (b21-2)

In this synthesis example, 95 parts of low-molecular ethylene/propylene random copolymer formed through thermal degradation, 10 parts of maleic acid anhydride and 30 parts of xylene were melted under 200° C. and reacted under 200° C. for 20 hours in a closed system with a nitrogen ambient. The thermal degradation was conducted under 410±0.1° C., and the raw material was an ethylene/propylene random copolymer having an ethylene amount of 0.2 wt %, a density of 0.90 g/cm$^3$ under 23° C. and a MFR of 6.0 g/10 min. The resulting copolymer had a Mn of 3500, a density of 0.89 g/cm$^3$, a double bond number of 7.1 per 1000 carbon atoms and an average double bond number of 1.8 per molecule, while the amount of polyolefin having two modificable terminals was 90%. Thereafter, the excess maleic acid anhydride and xylene were distilled/removed under a reduced pressure and 200° C. for 3 hours, so that acid-modified polypropylene (b21-1) was obtained, having an acid value of 27.2 and a Mn of 3700. Then, in a nitrogen ambient, 66 parts of (b21-1) and 34 parts of 12-aminododecanoic acid were melted under 200° C. and reacted under 200° C. and a reduced pressure of 1.3 kPa for 3 hours. Thereby, secondarily; modified polypropylene (b21-2) was obtained, having an acid value of 17.7 and a Mn of 5700.

Synthesis Example 8

Preparation of Cationic Polymer (b22-1)

In this synthesis example, 41 parts of N-methyldiethanolamine, 49 parts of adipic acid and 0.3 part of zirconium acetate were added into a glass autoclave. After the air in the autoclave was replaced by nitrogen, a polyester-forming reaction was performed by gradually heating the mixture to 220° C. during 2 hours and then gradually reducing the pressure to 0.13 kPa during 1 hour. After the reaction was completed, the temperature was lowered to 50° C., and 100 parts of methanol was added to dissolve the reaction product. The solution was stirred with the temperature in the reaction container kept at 120° C., and 43 parts of dimethyl sulfate was slowly added during 3 hours followed by aging of 6 hours under the same temperature. After the reaction product was cooled to room temperature, 100 parts of 60% aqueous solution of hexafluorophosphoric acid was added, and the mixture was stirred at room temperature for 1 hour. The solvent was then distilled/removed under a reduced pressure, so that cationic polymer (b22-1) having 12 quarternary ammonium groups in average was obtained, having a hydroxyl value of 30.1, a acid value of 0.5 and a volume resistivity of $1 \times 10^5$ Ω·cm.

Synthesis Example 9

Preparation of Block Polymer (B2-1)

In this synthesis example, 63.0 parts of (b21-2), 37.0 parts of 22-1, 0.3 part of antioxidant and 0.5 part of zirconium acetate were added into an autoclave of stainless steel, and polymerization was conducted under 230° C. and a reduced pressure of 0.13 kPa or lower for 4 hours to obtain a viscous polymer. The polymer was taken out on a belt in the form of strand and then made into pellets, so that block polymer (B2-1) was obtained, having a refractive index of 1.501.

Synthesis Example 10

Preparation of Block Polymer (B2-2)

In this synthesis example, block polymer (B2-2) was obtained with essentially the same method of Synthesis Example 9, except that 63.0 parts of (b21-2) and 37.0 parts of (b22-1) were replaced by 76.0 parts: of (b21-2) and 24 parts of polytetramethylene glycol having a Mn of 2000 and a volume resistivity of $2 \times 10^{11}$ Ω·cm. The refractive index of (B2-2) was 1.485.

Synthesis Example 11

Preparation of Anionic Polymer (b22-2) as Hydrophilic Polymer

In this synthesis example, 67 parts of polyethylene glycol (Mn=300), 49 parts of sodium salt of dimethyl 5-sulfoisophthalate and 0.2 part of dibutyl tin oxide were added into a reaction container. The mixture was heated to 190° C. under a reduced pressure of 0.67 kPa, and an ester-exchange reaction was conducted for 6 hours, wherein methanol was distilled/removed continuously. Thereby, anionic polymer (b22-2) was obtained, having averagely 5 sodium sulfonate groups per molecule, a hydroxyl value of 29.6, an acid value of 0.4 and a volume resistivity of $2 \times 10^6$ Ω·cm.

Synthesis Example 12

Preparation of Block Polymer (B2-3)

In this synthesis example, block polymer (B2-3) was obtained with essentially the same method of Synthesis Example 9, except that 63.0 parts of (b21-2) and 37.0 parts of (22-1) were replaced by 62.6 parts of (b21-2) and 37.4 parts of (b22-2). The refractive index of (B2-3) was 1.481.

Synthesis Example 13

Preparation of Block Polymer (B2-4)

In this synthesis example, block polymer (B2-4) was obtained with essentially the same method of Synthesis Example 9, except that 63.0 parts of (b21-2) and 37.0 parts of (b22-1) were replaced by 92.3 parts of, (b21-2) and 7.7 parts of a PO-adduct of bisphenol A having a Mn of 500 and a volume resistivity of $2 \times 10^{10}$ Ω·cm. The refractive index of (B2-4) was 1.488.

Synthesis Example 14

Preparation of Block Polymer (B2-5)

In this synthesis example, block polymer (B2-5) was obtained with essentially the same method of Synthesis Example 9, except that 63.0 parts of (b21-2) and 37.0 parts of (b22-1) were replaced by 76.0 parts of (b21-2) and 24.0 parts of polyethylene glycol having a Mn of 2000 and a volume resistivity of $1 \times 10^7$ Ω·cm. The refractive index of (B2-5) was 1.492.

Synthesis Example 15

Preparation of Block Polymer (B2-6)

In this synthesis example, block polymer (B2-6) was obtained with essentially the same method of Synthesis Example 9, except that 63.0 parts of (b21-2) and 37.0 parts of (b22-1) were replaced by 66.5 parts of (b21-2) and 33.5 parts of polypropylene glycol having a Mn of 3200 and a volume resistivity of $2 \times 10^9$ Ω·cm. The refractive index of (B2-6) was 1.479.

Synthesis Example 16

Preparation of Block Polymer (B2-7)

In this synthesis example, block polymer (B2-7) was obtained with essentially the same method of Synthesis Example 9, except that 63.0 parts of (b21-2) and 37.0 parts of (b22-1) were replaced by 86.0 parts of (b21-2) and 33.5 parts of an EO-adduct of bisphenol A having a Mn of 1000 and a volume resistivity of $2 \times 10^8$ Ω·cm. The refractive index of (B2-7) was 1.495.

Synthesis Example 17

Preparation of Block Polymer (B2-8)

In this synthesis example, block polymer (B2-8) was obtained with essentially the same method of Synthesis Example 9, except that 63.0 parts of (b21-2) and 37.0 parts of (b22-1) were replaced by 60.0 parts of (b21-2) and 33 parts of polyethylene glycol having a Mn of 3200 and a volume resistivity of $3 \times 10^8$ Ω·cm. The refractive index of (B2-8) was 1.492.

Synthesis Example 18

Preparation of Block Polymer (B2-9)

In this synthesis example, secondarily modified polypropylene b21-3 having an acid value of 16.0 and a Mn of 6800 was obtained, using essentially the same method of Synthesis Example 7, except that 66 pass of (b21-1) and 34 parts of 12-aminododecanoic acid were replaced by 25 parts of (b21-1) and 75 parts of 12-aminododecanoic acid. Thereafter, block polymer (B2-9) was obtained with essentially the same method of Synthesis Example 9, except that 63.0 parts of (b21-2) and 37.0 parts of (b22-1) were replaced by 71 parts of (b21-3), 22 parts of polyethylene glycol having a Mn of 2000 and a volume resistivity of $3 \times 10^8$ Ω·cm and 7 parts of sodium dodecylbenzenesulfonate. The refractive index of (B2-9) was 1.498.

Synthesis Example 19

Preparation of Cationic Polymer (b22-3) as Hydrophilic Polymer

In this synthesis example, cationic polymer (b22-3) was obtained using essentially the same method of Synthesis Example 8, except that 41 parts of N-methyldiethanolamine and 49 parts of adipic: acid were replaced by 41 parts of N-methyldiethanolamine and 55 parts of adipic acid. Cationic polymer (b22-3) had averagely 6 quarternary ammonium groups, a hydroxyl value of 14.8, an acid value of 1.4 and a volume resistivity of $1\times10^5$ Ω·cm.

Synthesis Example 20

Preparation of Block Polymer (B2-10)

In this synthesis example, block polymer (B2-10) was obtained with essentially the same method of Synthesis Example 9, except that 63.0 parts of (b21-2) and 37.0 parts of (b22-1) were replaced by 55.0 parts of (b21-3) and 45.0 parts of (b22-3). The refractive index of (B2-10) was 1.509.

Synthesis Example 21

Preparation of Polyetheresteramide (B 1-7)

In this synthesis example, 96 parts of polyamide having an acid value of 56.2 and carboxyl groups at two terminals thereof was obtained, using essentially the same method of Synthesis Example 1, except that 66.9 parts of ε-caprolactam and 33.1 parts of adipic acid were replaced by 91.8 parts of ε-caprolactam and 8.2 parts of terephthalic acid. Next, polyetheresteramide (B1-7) was obtained using essentially the same method of Synthesis Example 1, except that 240 parts of polyethyleneglycol (Mn=500) was replaced by 10 parts of an EO-adduct (Mn=300) of bisphenol A and 10 parts of another EO-adduct (Mn=1500) of bisphenol A. The refractive index of (B1-7) was 1.540.

Synthesis Example 22

Preparation of Modified Vinyl Copolymer (C31)

In this synthesis example, 235 parts of dimethylformamide (DMF) was added into a flask equipped with a stirrer, a reflux cooler, two dropping funnels, a thermometer and a nitrogen-blowing opening. The first dropping funnel contained 16 parts of acrylonitrile, 81 parts of styrene and 4 parts of glycidyl methacrylate, and the second one contained 1 part of azobisisobutyronitrile and 6 parts of DMF. The liquid temperature in the flask was raised to 80° C. with stirring, and the contents of the first and second dropping funnels were slowly dropped during 2 hours, with nitrogen introduced continuously and the liquid temperature kept at 80° C. After all of the contents were dropped, the mixture was continuously stirred under 80° C. for 5 hours. The solvent and unreacted monomers were distilled under a reduced pressure, so that styrene-arcylonitrile-glycidylmethacrylate copolymer [modified vinyl copolymer (C31)] as a compatibilizer was obtained, having a Mn of 39000 and a glass transition temperature (Tg) of 110° C.

Synthesis Example 23

Preparation of Modified Vinyl Copolymer (C32)

In a nitrogen ambient, 95 parts of low-molecular polypropylene (Mn=12000, density=0.89 g/cm$^3$) obtained through thermal degradation and 5 parts of maleic acid anhydride were melted under 180°. The thermal degradation process was conducted under 350° C. for 2 hours with PP resin (A-2) described later as a raw material, wherein nitrogen gas was introduced continuously. Next, a 50% xylene solution of 1.5 parts of dicumyl peroxide was dropped to the mixture during 15 min, and then a reaction was conducted for 1 hour. Thereafter, the solvent was removed with depressurization-distillation, so that modified vinyl copolymer (C32) was obtained, having an acid value of 25.7 and a Mn of 15000.

Examples 1-27 and Comparative Examples 1-6 (Of Re/sin Composition)

For each of the resin compositions of Examples 1-27 and Comparative Examples 1-6, the components thereof and their ratio are described in Table 1. The components were firstly blended for 3 min with a Henschel mixer, and then a twin-screw kneading extruder with a vent was used to melt-knead the mixture under the conditions of a certain temperature, 100 rpm and a retention time of 5 min to obtain the corresponding resin composition. The certain temperature was 230° C. for (A-1), (A-3), (A-6), (A-8) and (A-10), 220° C. for (A-2) and (A-9), 200° C. for (A4) and (A-7), and 160° C. for (A-5).

TABLE 1

| | | n* | 1 | 2 | 3 | 4 | 5 | 6 | 7 | 8 | 9 | 10 |
|---|---|---|---|---|---|---|---|---|---|---|---|---|
| ABS resin | A-1 | 1.519 | | | 90 | | | | | | | |
| PP resin | A-2 | 1.499 | | | | 85 | | | | | | |
| HIPS resin | A-3 | 1.535 | | | | | 80 | | | | | |
| PMMA resin | A-4 | 1.490 | | | | | | 90 | 90 | | | |
| Polyacetal resin | A-5 | 1.480 | | | | | | | | 85 | | |
| Nylon 6 resin | A-6 | 1.530 | | | | | | | | | 80 | |
| PE resin | A-7 | 1.500 | | | | | | | | | | |
| Transparent ABS resin | A-8 | 1.518 | 90 | 87 | | | | | | | | |
| Transparent PP resin | A-9 | 1.500 | | | | | | | | | | |
| PC/ABS resin | A-10 | 1.550 | | | | | | | | | | 90 |
| Polyetheresteramide | B1-1 | 1.505 | | | | 15 | | | | | | |
| | B1-2 | 1.512 | 10 | 10 | | | | | | | | |
| | B1-3 | 1.526 | | | 10 | | 20 | | | | | |
| | B1-4 | 1.508 | | | | | | 10 | 10 | | | |
| | B1-5 | 1.511 | | | | | | | | | 20 | |
| | B1-6 | 1.519 | | | | | | | | | | |
| | B1-7 | 1.540 | | | | | | | | | | 10 |

TABLE 1-continued

| | | | | | | | | | | | |
|---|---|---|---|---|---|---|---|---|---|---|---|
| Block polymer | B2-1 | 1.501 | | | | | | | | | |
| | B2-2 | 1.485 | | | | | | | | | |
| | B2-3 | 1.481 | | | | | | | | | |
| | B2-4 | 1.488 | | | | | | | | | |
| | B2-5 | 1.492 | | | | | | | | | |
| | B2-6 | 1.479 | | | | | | | | | |
| | B2-7 | 1.495 | | | | | | | 15 | | |
| | B2-8 | 1.492 | | | | | | | | | |
| | B2-9 | 1.498 | | | | | | | | | |
| | B2-10 | 1.509 | | | | | | | | | |
| Glycerin monostearate | B-3 | 1.491 | | | | | | | | | |
| Alkaline metal salt | C1 | — | | | | | | 0.5 | | | |
| Surfactant | C2 | — | | | | | | | 0.5 | | |
| Modified vinyl (co)polymer | C31 | — | 3 | | | | | | | | |
| | C32 | — | | | | | | | | | |
| Δn between (A) & (B) | | | 0.006 | 0.006 | 0.007 | 0.006 | 0.009 | 0.018 | 0.018 | 0.015 | 0.019 | 0.01 |

| | | | Example | | | | | | | | | |
|---|---|---|---|---|---|---|---|---|---|---|---|---|
| | | n* | 11 | 12 | 13 | 14 | 15 | 16 | 17 | 18 | 19 | 20 |
| ABS resin | A-1 | 1.519 | | | | | | | | | | |
| PP resin | A-2 | 1.499 | 85 | | | 85 | 85 | 77 | | | 90 | 80 |
| HIPS resin | A-3 | 1.535 | | | | | | | | | | |
| PMMA resin | A-4 | 1.490 | | 80 | | | | | 90 | | | |
| Polyacetal resin | A-5 | 1.480 | | | 90 | | | | | | | |
| Nylon 6 resin | A-6 | 1.530 | | | | | | | | | | |
| PE resin | A-7 | 1.500 | | | | | | | | 90 | | |
| Transparent ABS resin | A-8 | 1.518 | | | | | | | | | | |
| Transparent PP resin | A-9 | 1.500 | | | | | | | | | | |
| PC/ABS resin | A-10 | 1.550 | | | | | | | | | | |
| Polyetheresteramide | B1-1 | 1.505 | | | | | | | | | | |
| | B1-2 | 1.512 | | | | | | | | | | |
| | B1-3 | 1.526 | | | | | | | | | | |
| | B1-4 | 1.508 | | | | | | | | | | |
| | B1-5 | 1.511 | | | | | | | | | | |
| | B1-6 | 1.519 | | | | | | | | | | |
| | B1-7 | 1.540 | | | | | | | | | | |
| Block polymer | B2-1 | 1.501 | | | | | | | | | | |
| | B2-2 | 1.485 | 15 | | | | | | | | | |
| | B2-3 | 1.481 | | 20 | | | | | | | | |
| | B2-4 | 1.488 | | | 10 | | | | | | | |
| | B2-5 | 1.492 | | | | 15 | 15 | | | | | |
| | B2-6 | 1.479 | | | | | | 20 | | | | |
| | B2-7 | 1.495 | | | | | | | | | | |
| | B2-8 | 1.492 | | | | | | | 10 | | | |
| | B2-9 | 1.498 | | | | | | | | | 10 | 20 |
| | B2-10 | 1.509 | | | | | | | | 10 | | |
| Glycerin monostearate | B-3 | 1.491 | | | | | | | | | | |
| Alkaline metal salt | C1 | — | | | 0.5 | | | | | | | |
| Surfactant | C2 | — | | | | 0.5 | | | | | | |
| Modified vinyl (co)polymer | C31 | — | | | | | | | | | | |
| | C32 | — | | | | | 3 | | | | | |
| Δn between (A) & (B) | | | 0.014 | 0.009 | 0.008 | 0.007 | 0.007 | 0.02 | 0.002 | 0.009 | 0.001 | 0.001 |

| | | | Example | | | | | | | Comparative Example | | | | | |
|---|---|---|---|---|---|---|---|---|---|---|---|---|---|---|---|
| | | n* | 21 | 22 | 23 | 24 | 25 | 26 | 27 | 1 | 2 | 3 | 4 | 5 | 6 |
| ABS resin | A-1 | 1.519 | | | | | | 85 | | 90 | | | | | |
| PP resin | A-2 | 1.499 | 87 | | | | | | | | 85 | | | | |
| HIPS resin | A-3 | 1.535 | | | | | | | | | | 80 | | | |
| PMMA resin | A-4 | 1.490 | | | | 80 | 90 | | | | | | | 90 | |
| Polyacetal resin | A-5 | 1.480 | | | | | | | | | | | | | |
| Nylon 6 resin | A-6 | 1.530 | | | | | | | | | | | | | |
| PE resin | A-7 | 1.500 | | | | | | | 85 | | | | | | 98 |
| Transparent ABS resin | A-8 | 1.518 | | 90 | | | | | | | | | 85 | | |
| Transparent PP resin | A-9 | 1.500 | | | 85 | | | | | | | | | | |
| PC/ABS resin | A-10 | 1.550 | | | | | | | | | | | | | |
| Polyetberester-amide | B1-1 | 1.505 | | | | | | | | | | | | | |
| | B1-2 | 1.512 | | | | | | | | | | | | | |
| | B1-3 | 1.526 | | | | | | 10 | 5 | | 15 | | | | |
| | B1-4 | 1.508 | | | | | | | | | | | | | |
| | B1-5 | 1.511 | | | | | | | | | | | 20 | | |
| | B1-6 | 1.519 | | 10 | | | | | | | | | | | 10 |
| | B1-7 | 1.540 | | | | | | | | | | | | | |

TABLE 1-continued

| | | | | | | | | | | | | | |
|---|---|---|---|---|---|---|---|---|---|---|---|---|---|
| Blook polymer | B2-1 | 1.501 | | 15 | | | | | | | | | |
| | B2-2 | 1.485 | | | | | | | | | | | |
| | B2-3 | 1.481 | | | | | 5 | | | | | 15 | |
| | B2-4 | 1.488 | | | | 20 | | | | | | | |
| | B2-5 | 1.492 | | | | | 10 | | | | | | |
| | B2-6 | 1.479 | | | | | | | 10 | | | | |
| | B2-7 | 1.495 | | | | | | | 10 | | | | |
| | B2-8 | 1.492 | | | | | | | | | | | |
| | B2-9 | 1.498 | 10 | | | | | | | | | | |
| | B2-10 | 1.509 | | | | | | | | | | | |
| Glycerin monostearate | B-3 | 1.491 | | | | | | | | | | | 2 |
| Alkaline metal salt | C1 | — | 0.5 | | | | | | | | | | |
| Surfactant | C2 | — | | | | | | | | | | | |
| Modified vinyl (co)polymer | C31 | — | | | | | | | | | | | |
| | C32 | — | 3 | | | | | | | | | | |
| Δn of (A) & (B) | | | 0.001 | 0.001 | 0.001 | 0.002 | 0.002 | 0.008 | 0.005 | 0.04 | 0.027 | 0.024 | 0.037 | 0.029 |

*n = refractive index

In Table 1,
(A-1) is ABS resin having a trademark name "Cevian-V 320", produced by Daicel Polymer Ltd. and having a refractive index of 1.519.
(A-2) is PP resin having a trademark name "Chisso-Polypro K1008", produced by Chisso Corporation and having a refractive index of 1.499.
(A-3) is HIPS resin having a trademark name "Toyo Styrol-HI H450", produced by Toyo-Styrene Co., Ltd. and having a refractive index of 1.535.
(A-4) is PMMA resin having a trademark name "Acrypet VH", produced by Mitsubishi Rayon Co Ltd. and having a refractive index of 1.490.
(A-5) is polyacetal resin having a trademark name "Duracon M90S", produced by Polyplastics Co. Ltd. and having a refractive index of 1.480.
(A-6) is Nylon resin having a trademark name "Ube-Nylon 1013B, produced by Ube Industries, Ltd. and having a refractive index of 1.530.
(A-7) is PE resin having a trademark name "Jeirex E780", produced by Japan Polyolefin Corporation and having a refractive index of 1.500.
(A-8) is transparent ABS resin having a trademark name "Techno-ABS 810", produced by Techno Polymer Co., Ltd. and having a refractive index of 1.518.
(A-9) is transparent PP resin having a trademark name "SunAllomer PM863V", produced by SunAllomer Ltd. and having a refractive index of 1.500.
(A-10) is PC/ABS resin having a trademark name "Iupilon MB1800", produced by Mitsubishi Engineering-Plastics Corporation and having a refractive index of 1.550.
(B-3) is glycerin monostearate having a refractive index of 1.491.
(C1) is LiCl.
(C2) is sodium dodecylbenzenesulfonate.

Among them, (C1) or (C2) is added simultaneously with an AO-adduct of bisphenol A or polyethylene glycol during the production of antistatic agent (B).

[Molding Process]

The resin compositions obtained as above were respectively subjected to injection molding, extrusion film-molding and biaxially orientated film-molding under the following conditions:

(1) Injection Molding:
An injection molding machine PS40E5ASE, manufactured by Nissei Plastic Industrial Co., Ltd., is used to fabricate test plates, with the die temperature set to 50° C. and the cylinder temperature set to 230° C. for (A-1), (A-3), (A-6), (A-8) and (A-10), 220° C. for (A-2) and (A-9), 200° C. for (A-4) and (A-7), or 160° C. for (A-5).

(2) Extrusion Film-Molding:
An extrusion-molding machine equipped with a T-shaped die, Labo Plastomill 2D20C manufactured by Toyo Seiki Seisaku-Sho, Ltd., is used to form films with melt-extrusion using the same cylinder temperature setting as in the injection molding process (1), and a cooling roll of 20° C. is used to rapidly cool the extruded films. The films are formed in thickness of 10 μm and 200 μm.

(3) Biaxially Orientated Film-Molding:
This molding method is used in Examples 4, 11, 14-16 and 19-21, and Comparative Example 2. The extruded films of 200 μm obtained from the extrusion film-molding process (2) are drawn using a batch-type drawing apparatus heated to 155° C. so as to form biaxially orientated films of 20 μm in thickness.

[Performance Tests]
The injection molded products and films obtained as above were evaluated for their performances including mechanical properties [1], antistatic properties [2], compatibility [3] and transparency [4], based on the following testing methods. The results are listed in Table 2.

[1] Evaluating Methods for Mechanical Properties:
(1) For impact strength: The impact strength of an injection molded product is measured using Method A of ASTM D256 (1984), wherein a notch is formed and the sample thickness is 3.2 mm.
(2) For flexural modulus: The flexural modulus of an injection molded product is measured according to ASTM D790 (1984) using test plates of 10×4×100 mm³ with the distance between supporting points being 64 mm.
(3) For tensile strength: An extruded film of 200 μm is measured for its tensile strength as one of its mechanical properties.

[2] Evaluating Methods for Antistatic Properties [based on ASTM D257 (1984)]:
(1) For surface resistivity: The above injection molded products, the extruded films of 10 μm and 200 μm and the biaxially orientated films of 20 μm are respectively cut into films of 100×100 mm² as test plates. The test plates are left under 23° C. and 50% RH for 48 hours, and are then measured using a super insulation meter manufactured by Advantest Corporation in the same ambient.

(2) For surface resistivity after water-washing. The same test plates as described in section (1) are placed tilt and washed with 100 ml of ion-exchange water of 23° C. in a flow rate of 100 ml/min, and are then dried under 80° C. in a air-circulating dryer for 3 hours. The washing-drying operation is repeated 10 times, and then the test plates are left under 23° C. and 50% RH for 48 hours. Thereafter, the test plates are measured with the above super insulation meter in the same ambient.

(3) For volume resistivity: The same test plates as used in the measurement of surface resistivity are measured for their volume surface resistance using the same method based on ASTM D257.

[3] Evaluating Method for Compatibility:

The resin composition to be analyzed is extruded from a capillary (φ1 mm×10 mm) in a shear rate of $10^3$ s$^{-1}$ using Capillograph 1B manufactured by Toyo Seiki Seisaku-Sho, Ltd., wherein the temperature setting is 230° C. when (A-1), (A-3), (A-6), (A-8) or (A-10) is used, 220° C. when (A-2) or (A-9) is used, 200° C. when (A-4) or (A-7) is used, or 160° C. when (A-5) is used. After being rapidly cooled to room temperature, the extruded resin composition is observed using a SEM for the dispersion pattern of (B) on its surface. Then, the number average grain size is calculated using the aforementioned method, thereby evaluating the compatibility between (A) and (B).

[4] Evaluating Method for Transparency [Based on JIS K7105 (1981)]

In this evaluation, the injection molded products and the extruded films of 10 μm and 200 μm in thickness of Examples 22-25 and Comparative Examples 4 and 5 are measured for their haze values.

TABLE 2

| | Mechanical Properties | | | Antistatic properties | | | | | |
|---|---|---|---|---|---|---|---|---|---|
| | Injection molded product | | Extruded film | Injection molded product | | | Extruded film of 10 μm | | |
| | Impact strength (J/m) | Flexural modulus (MPa) | Tensile strength (MPa) | Surface resistivity (Ω) | Surface resistivity (Ω) after wafer-washing | Volume resistivity (Ω·cm) | Surface resistivity (Ω) | Surface resistivity (Ω) after wafer-washing | Volume resistivity (Ω·cm) |
| Ex. 1 | 140 | 2,000 | 38 | $8 \times 10^{13}$ | $8 \times 10^{11}$ | $3 \times 10^{12}$ | $1 \times 10^{12}$ | $1 \times 10^{12}$ | $4 \times 10^{12}$ |
| Ex. 2 | 145 | 2,100 | 41 | $9 \times 10^{22}$ | $1 \times 10^{12}$ | $4 \times 10^{12}$ | $1 \times 10^{12}$ | $1 \times 10^{12}$ | $3 \times 10^{12}$ |
| Ex. 3 | 170 | 2,200 | 45 | $8 \times 10^{11}$ | $7 \times 10^{11}$ | $9 \times 10^{11}$ | $9 \times 10^{12}$ | $8 \times 10^{12}$ | $1 \times 10^{12}$ |
| Ex. 4 | 110 | 1,400 | 20 | $8 \times 10^{10}$ | $8 \times 10^{10}$ | $9 \times 10^{10}$ | $9 \times 10^{10}$ | $7 \times 10^{10}$ | $9 \times 10^{10}$ |
| Ex. 5 | 110 | 2,400 | 38 | $5 \times 10^{10}$ | $5 \times 10^{10}$ | $5 \times 10^{10}$ | $6 \times 10^{10}$ | $5 \times 10^{10}$ | $6 \times 10^{10}$ |
| Ex. 6 | 19 | 2,900 | 55 | $3 \times 10^{11}$ | $3 \times 10^{11}$ | $5 \times 10^{11}$ | $2 \times 10^{11}$ | $3 \times 10^{12}$ | $7 \times 10^{11}$ |
| Ex. 7 | 19 | 2,900 | 54 | $8 \times 10^{11}$ | $8 \times 10^{11}$ | $9 \times 10^{11}$ | $9 \times 10^{11}$ | $8 \times 10^{12}$ | $9 \times 10^{11}$ |
| Ex. 8 | 55 | 2,400 | 60 | $6 \times 10^{10}$ | $5 \times 10^{10}$ | $7 \times 10^{10}$ | $6 \times 10^{10}$ | $7 \times 10^{10}$ | $8 \times 10^{30}$ |
| Ex. 9 | 55 | 2,400 | 45 | $3 \times 10^{10}$ | $3 \times 10^{10}$ | $3 \times 10^{10}$ | $5 \times 10^{10}$ | $4 \times 10^{10}$ | $6 \times 10^{30}$ |
| Ex. 10 | 465 | 2,600 | 57 | $9 \times 10^{11}$ | $9 \times 10^{11}$ | $1 \times 10^{12}$ | $9 \times 10^{12}$ | $8 \times 10^{11}$ | $2 \times 10^{12}$ |
| Ex. 11 | 110 | 1,400 | 20 | $9 \times 10^{10}$ | $9 \times 10^{10}$ | $2 \times 10^{11}$ | $9 \times 10^{10}$ | $8 \times 10^{10}$ | $1 \times 10^{11}$ |
| Ex. 12 | 20 | 2,800 | 53 | $3 \times 10^{10}$ | $3 \times 10^{30}$ | $4 \times 10^{10}$ | $3 \times 10^{10}$ | $4 \times 10^{10}$ | $6 \times 10^{30}$ |
| Ex. 13 | 58 | 2,500 | 61 | $1 \times 10^{11}$ | $2 \times 10^{31}$ | $3 \times 10^{22}$ | $9 \times 10^{10}$ | $9 \times 10^{10}$ | $2 \times 10^{11}$ |
| Ex. 14 | 110 | 1,400 | 21 | $6 \times 10^{10}$ | $6 \times 10^{10}$ | $7 \times 10^{10}$ | $6 \times 10^{10}$ | $6 \times 10^{10}$ | $8 \times 10^{30}$ |
| Ex. 15 | 110 | 1,400 | 21 | $8 \times 10^{10}$ | $8 \times 10^{10}$ | $9 \times 10^{10}$ | $9 \times 10^{10}$ | $8 \times 10^{10}$ | $9 \times 10^{20}$ |
| Ex. 16 | 116 | 1,400 | 20 | $4 \times 10^{10}$ | $4 \times 10^{10}$ | $5 \times 10^{10}$ | $4 \times 10^{10}$ | $2 \times 10^{10}$ | $6 \times 10^{30}$ |
| Ex. 17 | 19 | 2,800 | 55 | $1 \times 10^{11}$ | $1 \times 10^{11}$ | $5 \times 10^{11}$ | $2 \times 10^{11}$ | $2 \times 10^{11}$ | $5 \times 10^{11}$ |
| Ex. 18 | 41 | 1,500 | 19 | $1 \times 10^{11}$ | $1 \times 10^{11}$ | $1 \times 10^{11}$ | $8 \times 10^{10}$ | $8 \times 10^{10}$ | $1 \times 10^{11}$ |
| Ex. 19 | 116 | 1,500 | 18 | $1 \times 10^{11}$ | $1 \times 10^{11}$ | $1 \times 10^{11}$ | $3 \times 10^{11}$ | $3 \times 10^{13}$ | $5 \times 10^{11}$ |
| Ex. 20 | 110 | 1,400 | 18 | $3 \times 10^{10}$ | $3 \times 10^{10}$ | $4 \times 10^{10}$ | $4 \times 10^{10}$ | $4 \times 10^{10}$ | $5 \times 10^{10}$ |
| Ex. 21 | 118 | 1,600 | 20 | $1 \times 10^{11}$ | $1 \times 10^{11}$ | $1 \times 10^{11}$ | $9 \times 10^{10}$ | $8 \times 10^{10}$ | $1 \times 10^{13}$ |
| Ex. 22 | 145 | 2,000 | 38 | $7 \times 10^{11}$ | $7 \times 10^{11}$ | $9 \times 10^{11}$ | $8 \times 10^{11}$ | $9 \times 10^{11}$ | $1 \times 10^{12}$ |
| Ex. 23 | 35 | 900 | 17 | $7 \times 10^{10}$ | $7 \times 10^{10}$ | $1 \times 10^{11}$ | $7 \times 10^{10}$ | $6 \times 10^{10}$ | $1 \times 10^{11}$ |
| Ex. 24 | 18 | 2,800 | 56 | $3 \times 10^{10}$ | $2 \times 10^{10}$ | $3 \times 10^{10}$ | $4 \times 10^{10}$ | $3 \times 10^{10}$ | $4 \times 10^{10}$ |
| Ex. 25 | 19 | 2,900 | 55 | $9 \times 10^{10}$ | $9 \times 10^{10}$ | $1 \times 10^{11}$ | $9 \times 10^{10}$ | $8 \times 10^{10}$ | $2 \times 10^{11}$ |
| Ex. 26 | 165 | 2,200 | 46 | $6 \times 10^{10}$ | $6 \times 10^{10}$ | $7 \times 10^{10}$ | $7 \times 10^{10}$ | $7 \times 10^{10}$ | $8 \times 10^{10}$ |
| Ex. 27 | 41 | 1,550 | 19 | $4 \times 10^{10}$ | $4 \times 10^{10}$ | $6 \times 10^{10}$ | $4 \times 10^{10}$ | $2 \times 10^{10}$ | $6 \times 10^{10}$ |
| CEx. 1 | 140 | 1,800 | 31 | $7 \times 10^{12}$ | $9 \times 10^{12}$ | $5 \times 10^{13}$ | $1 \times 10^{14}$ | $9 \times 10^{13}$ | $6 \times 10^{15}$ |
| CEx. 2 | 85 | 1,100 | 16 | $1 \times 10^{12}$ | $2 \times 10^{12}$ | $2 \times 10^{12}$ | $3 \times 10^{14}$ | $2 \times 10^{14}$ | $1 \times 10^{15}$ |
| CEx. 3 | 77 | 1,800 | 31 | $9 \times 10^{11}$ | $8 \times 10^{11}$ | $5 \times 10^{12}$ | $1 \times 10^{14}$ | $2 \times 10^{14}$ | $9 \times 10^{14}$ |
| CEx. 4 | 100 | 1,500 | 30 | $8 \times 10^{13}$ | $8 \times 10^{13}$ | $5 \times 10^{14}$ | $6 \times 10^{14}$ | $7 \times 10^{14}$ | $2 \times 10^{15}$ |
| CEx. 5 | 10 | 2,500 | 45 | $6 \times 10^{13}$ | $6 \times 10^{13}$ | $7 \times 10^{14}$ | $4 \times 10^{15}$ | $6 \times 10^{15}$ | $2 \times 10^{15}$ |
| CEx. 6 | 35 | 1,350 | 17 | $6 \times 10^{11}$ | $8 \times 10^{14}$ | $5 \times 10^{14}$ | $8 \times 10^{11}$ | $6 \times 10^{14}$ | $9 \times 10^{14}$ |

| | Antistatic properties | | | | | | | Transparency | | |
|---|---|---|---|---|---|---|---|---|---|---|
| | Extruded film of 200 μm | | | Biaxially orientated film of 20 μm | | | | | | |
| | Surface resistivity (Ω) | Surface resistivity (Ω) after wafer-washing | Volume resistivity (Ω·cm) | Surface resistivity (Ω) | Surface resistivity (Ω) after wafer-washing | Volume resistivity (Ω·cm) | Compatibility Size of dispersed grains (μm) | Injection molded product Haze (%) | Extruded film of 10 μm Haze (%) | Extruded film of 200 μm Haze (%) |
| Ex. 1 | $2 \times 10^{12}$ | $1 \times 10^{12}$ | $4 \times 10^{12}$ | | | | 0.08 | | | |
| Ex. 2 | $1 \times 10^{12}$ | $1 \times 10^{12}$ | $3 \times 10^{12}$ | | | | 0.05 | | | |
| Ex. 3 | $9 \times 10^{11}$ | $8 \times 10^{11}$ | $1 \times 10^{12}$ | | | | 0.06 | | | |

TABLE 2-continued

| | | | | | | | | | | |
|---|---|---|---|---|---|---|---|---|---|---|
| Ex. 4 | $9 \times 10^{10}$ | $7 \times 10^{20}$ | $9 \times 10^{10}$ | $6 \times 10^{10}$ | $6 \times 10^{10}$ | $9 \times 10^{10}$ | 0.53 | | | |
| Ex. 5 | $6 \times 10^{10}$ | $5 \times 10^{20}$ | $6 \times 10^{10}$ | | | | 0.07 | | | |
| Ex. 6 | $1 \times 10^{11}$ | $2 \times 10^{11}$ | $5 \times 10^{11}$ | | | | 0.10 | | | |
| Ex. 7 | $7 \times 10^{11}$ | $8 \times 10^{11}$ | $9 \times 10^{11}$ | | | | 0.10 | | | |
| Ex. 8 | $6 \times 10^{10}$ | $7 \times 10^{10}$ | $8 \times 10^{10}$ | | | | 0.10 | | | |
| Ex. 9 | $5 \times 10^{10}$ | $4 \times 10^{10}$ | $6 \times 10^{10}$ | | | | 0.08 | | | |
| Ex. 10 | $9 \times 10^{11}$ | $9 \times 10^{11}$ | $2 \times 10^{12}$ | | | | 0.31 | | | |
| Ex. 11 | $9 \times 10^{10}$ | $8 \times 10^{10}$ | $1 \times 10^{11}$ | $7 \times 10^{10}$ | $6 \times 10^{10}$ | $1 \times 10^{12}$ | 0.10 | | | |
| Ex. 12 | $4 \times 10^{10}$ | $4 \times 10^{10}$ | $5 \times 10^{10}$ | | | | 0.18 | | | |
| Ex. 13 | $9 \times 10^{10}$ | $9 \times 10^{10}$ | $2 \times 10^{11}$ | | | | 0.15 | | | |
| Ex. 14 | $6 \times 10^{10}$ | $6 \times 10^{10}$ | $8 \times 10^{10}$ | $3 \times 10^{10}$ | $2 \times 10^{10}$ | $6 \times 10^{10}$ | 0.09 | | | |
| Ex. 15 | $9 \times 10^{10}$ | $8 \times 10^{10}$ | $9 \times 10^{10}$ | $6 \times 10^{10}$ | $7 \times 10^{10}$ | $9 \times 10^{10}$ | 0.09 | | | |
| Ex. 16 | $4 \times 10^{10}$ | $4 \times 10^{10}$ | $6 \times 10^{10}$ | $3 \times 10^{10}$ | $3 \times 10^{10}$ | $5 \times 10^{10}$ | 0.06 | | | |
| Ex. 17 | $2 \times 10^{11}$ | $2 \times 10^{11}$ | $4 \times 10^{11}$ | | | | 0.08 | | | |
| Ex. 18 | $9 \times 10^{10}$ | $8 \times 10^{10}$ | $2 \times 10^{11}$ | | | | 0.18 | | | |
| Ex. 19 | $3 \times 10^{11}$ | $4 \times 10^{11}$ | $8 \times 10^{11}$ | $3 \times 10^{11}$ | $1 \times 10^{11}$ | $1 \times 10^{11}$ | 0.10 | | | |
| Ex. 20 | $3 \times 10^{10}$ | $4 \times 10^{30}$ | $6 \times 10^{10}$ | $9 \times 10^{9}$ | $9 \times 10^{9}$ | $1 \times 10^{11}$ | 0.10 | | | |
| Ex. 21 | $8 \times 10^{10}$ | $8 \times 10^{30}$ | $2 \times 10^{11}$ | $6 \times 10^{10}$ | $7 \times 10^{10}$ | $1 \times 10^{11}$ | 0.05 | | | |
| Ex. 22 | $8 \times 10^{11}$ | $9 \times 10^{11}$ | $1 \times 10^{12}$ | | | | 0.08 | 3 | 1 | 1 |
| Ex. 23 | $7 \times 10^{10}$ | $7 \times 10^{10}$ | $2 \times 10^{11}$ | | | | 0.07 | 5 | 1 | 1 |
| Ex. 24 | $4 \times 10^{10}$ | $3 \times 10^{10}$ | $4 \times 10^{10}$ | | | | 0.08 | 3 | 1 | 1 |
| Ex. 25 | $9 \times 10^{10}$ | $8 \times 10^{10}$ | $2 \times 10^{12}$ | | | | 0.09 | 2 | 1 | 1 |
| Ex. 26 | $7 \times 10^{10}$ | $7 \times 10^{10}$ | $8 \times 10^{10}$ | | | | 0.10 | | | |
| Ex. 27 | $4 \times 10^{10}$ | $5 \times 10^{10}$ | $5 \times 10^{10}$ | | | | 0.09 | | | |
| CEx. 1 | $1 \times 10^{14}$ | $3 \times 10^{14}$ | $6 \times 10^{13}$ | | | | 1.11 | | | |
| CEx. 2 | $3 \times 10^{14}$ | $3 \times 10^{14}$ | $1 \times 10^{13}$ | $9 \times 10^{13}$ | $8 \times 10^{13}$ | $1 \times 10^{14}$ | 1.86 | | | |
| CEx. 3 | $1 \times 10^{14}$ | $2 \times 10^{14}$ | $9 \times 10^{14}$ | | | | 2.00 | | | |
| CEx. 4 | $6 \times 10^{14}$ | $8 \times 10^{14}$ | $2 \times 10^{15}$ | | | | 2.15 | 31 | 28 | 31 |
| CEx. 5 | $4 \times 10^{15}$ | $6 \times 10^{15}$ | $2 \times 10^{15}$ | | | | 1.31 | 45 | 41 | 45 |
| CEx. 6 | $9 \times 10^{11}$ | $6 \times 10^{14}$ | $2 \times 10^{15}$ | | | | NA | | | |

*Ex. = Example, CEx. = Comparative Example, NA = Not Available

As shown in Table 2, as compared with the resin compositions and the molded products therefrom in Comparative Examples 1-6 of the prior art, the resin compositions and the molded products therefrom of Examples 1-27 of this invention perform better in all aspects, including mechanical properties, antistatic properties, compatibility and transparency. Moreover, the resin composition of this invention has a surface resistivity capable of developing good antistatic effect, even being molded with different molding methods like injection molding, extrusion film-molding or biaxially orientated film-molding. Furthermore, the antistatic effect of the molded products of this invention can be maintained semi-permanently, since the surface resistivity thereof is almost not changed even with water-washing. In addition, when the resin composition of this invention is added with an alkaline metal salt or a surfactant, the molded products therefrom can have particularly superior performance, i.e., can have a surface resistivity capable of developing permanent antistatic effect.

UTILITY IN INDUSTRY

As mentioned above, the antistatic resin compositions of this invention are better in dispersability of the antistatic agent, and the molded product therefrom are better in antistatic effect, transparency and mechanical strength. Therefore, the antistatic resin compositions or molded products of this invention are very useful as various materials requiring antistatic effect, such as, the housing material of household appliances (e.g., the frame of projection TV), office affair machine, game machine and business machine; the material of various plastic containers like IC tray; packing materials like various types of films; covering materials likes protective films; flooring materials like artificial, lawn, mat and sheet; and tape material like those used in semiconductor manufacturing process.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An antistatic resin composition, comprising a thermoplastic resin (A), an antistatic agent (B) having a hydrophilic chain and at least one additive (C) selected from the group consisting of alkali metal salts of organic acids, alkaline earth metal salts of organic acid, anionic surfactants, cationic surfactants and amphoteric surfactants, wherein a difference between refractive indexes of the thermoplastic resin (A) and the antistatic agent (B) is not more than 0.02, and the antistatic agent (B) comprises at least one material selected from the group consisting of (B1) and (B2), wherein
   (B1) is a polyetheresteramide derived from a polyamide (b11) having a number average molecular weight of 200-5000 and an alkyleneoxide adduct (b12) of bisphenol that has a number average molecular weight of 300-5000;
   (B2) is a block polymer which has a structure such that blocks of a polyolefin (b21) and blocks of a hydrophilic polymer (b22) having a volume resistivity of $10^5$-$10^{11}$ $\Omega \cdot cm$ are bonded together alternately and repeatedly via at least one bonding mode selected from the group consisting of ester bonding, amide bonding, ether bonding, imide bonding and urethane bonding; and
   (B1) and (B2) are prepared in presence of the at least one additive (C).

2. The antistatie resin composition of claim 1, wherein the difference between the refractive indexes of (A) and (B) is not more than 0.005.

3. The antistatic resin composition of claim 1, wherein the refractive index of (A) ranges from 1.480 to 1.550.

4. The antistatic resin composition of claim 3, wherein (A) comprises one or more thermoplastic resins selected from the group consisting of vinyl resins, polyester resins, polyamide resins and polycarbonate resins.

5. The antistatic resin composition of claim 1, satisfying at least one of two relationships: 1) the refractive index of (131) ranges from 1.520 to 1.540, and 2) the refractive index of (B2) ranges from 1.498 to 1.515.

6. The antistatic resin composition of claim 5, wherein (A) comprises one or more thermoplastic resins selected from the group consisting of vinyl resins, polyester resins, polyamide resins and polycarbonate resins.

7. The antistatic resin composition of claim 1, wherein a weight ratio of (A) to (B) ranges from 99/1 to 50/50.

8. The antistatic resin composition of claim 1, further comprising at least one additive (C) selected from the group consisting of compatibilizers, nucleating agents, lubricating agents, plasticizers, mold release agents, antioxidants, flame retardants, UV absorbents and antibacterial agents.

9. The antistatic resin composition of claim 1, wherein an amount of (A) ranges from 45 wt % to 99 wt %, and an amount of the antistatic agent (B) ranges from 0.5 wt % to 50 wt %.

10. The antistatic resin composition of claim 1, wherein the antistatic agent (B) is shown to have a number average grain size of 0.05-1 μm when a scanning electronic microscope (SEM) is used to observe surface of the antistatic resin composition that is previously extruded from a capillary under a shear rate of $10^3$ $s^{-1}$.

11. A method for giving antistatic property to thermoplastic resin (A), comprising adding, into the thermoplastic resin (A), an antistatic agent (B) having a hydrophilic chain and comprising at least one material selected from the group consisting of (B1) and (B2), and at least one additive (C) selected from the group consisting of alkali metal salts of organic acids, alkaline earth metal salts of organic acids, anionic surfactants, cationic surfactants and amphoteric surfactants, wherein a difference between refractive indexes of the thermoplastic resin (A) and the antistatic agent (B) is not more than 0.02;

(B1) is polyetheresteramide derived from polyamide (b11) having a number average molecular weight of 200-5000 and an alkyleneoxide adduct (b12) of bisphenot that has a number average molecular weight of 300-5000;

(B2) is a block polymer which has a structure such that blocks of a polyolefin (b21) and blocks of a hydrophilic polymer (b22) having a volume resistivity of $10^5$-$10^{11}$ Ω·cm are bonded together alternately and repeatedly via at least one bonding mode selected from the group consisting of ester bonding, amide bonding, ether bonding, imide bonding and urethane bonding; and (B1) and (B2) are prepared in presence of the at least one additive (C).

12. A molded product of antistatic resin, molded from the antistatic resin composition of claim 1.

13. The molded product of claim 12, having a haze not more than 20%.

14. The molded product of claim 12, having a haze of 0-10%.

15. The molded product of claim 12, which is shaped as a film.

16. A multi-layer film, comprising the film of claim 15 and a base film that comprises the thermoplastic resin (A).

17. A molded article, comprising a molded product of claim 12 to which coating and/or printing is applied.

18. A housing material, container material, packing material, covering material, flooring material or tape material, comprising a molded product of claim 12.

* * * * *